United States Patent
Suzuki et al.

(10) Patent No.: US 8,409,775 B2
(45) Date of Patent: *Apr. 2, 2013

(54) CROSSLINKED RESIN PARTICLE DISPERSION LIQUID

(75) Inventors: Manabu Suzuki, Wakayama (JP); Yutaka Murai, Wakayama (JP)

(73) Assignee: Kao Corporation, Tokyo (JP)

( * ) Notice: Subject to any disclaimer, the term of this patent is extended or adjusted under 35 U.S.C. 154(b) by 470 days.

This patent is subject to a terminal disclaimer.

(21) Appl. No.: 12/676,531

(22) PCT Filed: Sep. 5, 2008

(86) PCT No.: PCT/JP2008/066090
§ 371 (c)(1),
(2), (4) Date: Mar. 4, 2010

(87) PCT Pub. No.: WO2009/031655
PCT Pub. Date: Mar. 12, 2009

(65) Prior Publication Data
US 2010/0183969 A1    Jul. 22, 2010

(30) Foreign Application Priority Data

Sep. 7, 2007 (JP) ................... 2007-232476
Jun. 4, 2008 (JP) ................... 2008-147063

(51) Int. Cl.
*G03G 9/08* (2006.01)
(52) U.S. Cl. ............... 430/108.2; 430/109.4; 430/110.4; 430/137.14
(58) Field of Classification Search ............... 430/108.2, 430/109.4, 110.4, 137.14; 524/243
See application file for complete search history.

(56) References Cited

U.S. PATENT DOCUMENTS

| | | | |
|---|---|---|---|
| 6,017,670 A | 1/2000 | Hashizume et al. |
| 6,194,510 B1 | 2/2001 | Anderson et al. |
| 6,316,538 B1 | 11/2001 | Anderson et al. |
| 2002/0061959 A1 | 5/2002 | Kajimaru et al. |

FOREIGN PATENT DOCUMENTS

| | | |
|---|---|---|
| JP | 02 053078 | 2/1990 |
| JP | 10 10774 | 1/1998 |
| JP | 2000 347455 | 12/2000 |
| JP | 2002 509945 | 4/2002 |
| JP | 2002 173582 | 6/2002 |
| JP | 2006 106291 | 4/2006 |
| JP | 2006 182950 | 7/2006 |
| JP | 2007 031603 | 2/2007 |

OTHER PUBLICATIONS

Office Action issued Dec. 12, 2011 in China Application No. 200880105622.3 (With English Translation).
Chinese Office Action issued Jun. 25, 2012, in Patent Application No. 200880105622.3 (with English-language translation).

*Primary Examiner* — Mark A Chapman
(74) *Attorney, Agent, or Firm* — Oblon, Spivak, McClelland, Maier & Neustadt, L.L.P.

(57) ABSTRACT

The present invention relates to a toner for electrophotography which has a small particle size and is excellent in all of low-temperature fusing ability, anti-hot offset property and image characteristics and a process for producing the toner, as well as to a dispersion of crosslinked resin particles which is used for production of the toner for electrophotography and a process for producing the dispersion of crosslinked resin particles. The dispersion of crosslinked resin particles having a volume median particle size ($D_{50}$) of from 0.05 to 0.7 μm according to the present invention is produced by a process including the steps of (A) neutralizing a resin containing an acid group-containing polyester in an aqueous medium to obtain a dispersion of resin particles; and (B) mixing the dispersion of resin particles obtained in the step (A) with an oxazoline group-containing polymer at a temperature of from 60 to 100° C.

8 Claims, No Drawings

CROSSLINKED RESIN PARTICLE DISPERSION LIQUID

CROSS REFERENCES TO RELATED APPLICATIONS

This application is a 371 of International Patent Application No. PCT/JP2008/066090, filed on Sep. 5, 2008, and claims priority to Japanese Patent Application No. 2007-232476, filed on Sep. 7, 2007, and Japanese Patent Application No. 2008-147063, filed on Jun. 4, 2008.

TECHNICAL FIELD

The present invention relates to a toner for electrophotography for use in electrophotographic method, electrostatic recording method, electrostatic printing method or the like, and a dispersion of crosslinked resin particles used for producing the toner.

BACKGROUND ART

In the field of toners for electrophotography, with the recent tendency toward a higher image quality and a higher copying speed, it has been demanded to develop toners which have a small particle size and are excellent in low-temperature fusing ability and anti-hot offset property.

As a method for producing the toners, there are conventionally known a melt-kneading and pulverization method and a wet process such as an emulsification and aggregation method. Among them, toners obtained by the wet process (so-called chemical toners) have been noticed from the viewpoint of reducing a particle size of the toners.

As a method for enhancing a fusing performance of the chemical toners, there is disclosed a technique of adding a crosslinking agent during a process for production of the toners. For example, Patent Document 1 discloses a method for producing a chemical toner in which a carbodiimide group-containing compound as a crosslinking agent is added to emulsified particles to aggregate the emulsified particles. Patent Document 2 discloses a method for producing a chemical toner in which a compound containing two or more oxazoline groups on the average in a molecule thereof as a crosslinking agent is added to emulsified particles to subject the emulsified particles to aggregation and crosslinking reaction. Patent Document 3 discloses a method for producing a chemical toner in which an oxazoline group-containing polymer as a crosslinking agent is added to emulsified particles to aggregate the emulsified particles and thereby prepare a toner, and then the resulting toner undergoes a crosslinking reaction in a fusing step for forming images. Patent Documents 4 and 5 disclose techniques in which resin particles containing a resin binder obtained by crosslinking a resin with an oxazoline group-containing compound are directly used as a toner.

Patent Document 1: JP 2006-317715A
Patent Document 2: JP 2006-106291A
Patent Document 3: JP 2004-163854A
Patent Document 4: JP 2000-347455A
Patent Document 5: JP 10-10774A

DISCLOSURE OF THE INVENTION

Problem to be Solved by the Invention

However, the chemical toners obtained by the above conventional methods and techniques in which the toners are produced by adding a crosslinking agent tend to be deteriorated in image characteristics, in particular, anti-fogging property, although they are improved in fusing ability to some extent owing to a crosslinking effect by addition of the crosslinking agent.

The present invention relates to a dispersion of crosslinked resin particles which is used for production of a toner for electrophotography having a small particle size and an excellent stability and a process for producing the dispersion of crosslinked resin particles, as well as to a toner for electrophotography which is obtained by using the dispersion of crosslinked resin particles and is excellent in all of low-temperature fusing ability, anti-hot offset property and image characteristics and a process for producing the toner.

Means for Solving Problem

Thus, the present invention relates to the following aspects [1] to [4].

[1] A dispersion of crosslinked resin particles having a volume median particle size ($D_{50}$) of from 0.05 to 0.7 μm, the dispersion being produced by a process including the steps of:

(A) neutralizing a resin containing an acid group-containing polyester in an aqueous medium to obtain a dispersion of resin particles; and (B) mixing the dispersion of resin particles obtained in the step (A) with an oxazoline group-containing polymer at a temperature of from 60 to 100° C.

[2] A process for producing a dispersion of crosslinked resin particles having a volume median particle size ($D_{50}$) of from 0.05 to 0.7 μm, including the steps of:

(A) neutralizing a resin containing an acid group-containing polyester in an aqueous medium to obtain a dispersion of resin particles; and (B) mixing the dispersion of resin particles obtained in the step (A) with an oxazoline group-containing polymer at a temperature of from 60 to 100° C.

[3] A toner for electrophotography which is obtained by aggregating and coalescing the crosslinked resin particles contained in the dispersion of crosslinked resin particles as defined in the above [1].

[4] A process for producing a toner for electrophotography, including the steps of:

(a) obtaining a dispersion of crosslinked resin particles by the process as defined in the above [2]; and (b) aggregating and coalescing the crosslinked resin particles contained in the dispersion of crosslinked resin particles obtained in the step (a).

Effect of the Invention

In accordance with the present invention, there are provided a dispersion of crosslinked resin particles which is used for production of a toner for electrophotography having a small particle size and an excellent stability and a process for producing the dispersion of crosslinked resin particles, as well as a toner for electrophotography which is obtained by using the dispersion of crosslinked resin particles and is excellent in all of low-temperature fusing ability, anti-hot offset property and image characteristics and a process for producing the toner.

BEST MODE FOR CARRYING OUT THE INVENTION

Dispersion of Crosslinked Resin Particles

The dispersion of crosslinked resin particles according to the present invention (hereinafter occasionally referred to merely as a "resin particle dispersion") is obtained by a process including the steps of (A) neutralizing a resin containing an acid group-containing polyester in an aqueous medium to obtain a dispersion of resin particles; and (B) mixing the dispersion of resin particles obtained in the step (A) with an oxazoline group-containing polymer at a temperature of from 60 to 100° C. The crosslinked resin particles contained in the crosslinked resin particle dispersion have a volume median particle size ($D_{50}$) of from 0.05 to 0.7 µm.

(Step (A))

In the step (A), a resin containing an acid group-containing polyester is neutralized in an aqueous medium to obtain a dispersion of resin particles.

Resin Containing an Acid Group-Containing Polyester

The resin binder constituting the resin particles in the resin particle dispersion contains an acid group-containing polyester from the viewpoints of a good fusing ability and a good durability of a toner produced therefrom. The content of the polyester in the resin binder is preferably 60% by weight or more, more preferably 70% by weight or more, even more preferably 80% by weight or more, and further even more preferably substantially 100% by weight on the basis of the weight of the resin binder constituting the resin particles from the viewpoints of a good fusing ability and a good durability of the resulting toner.

Examples of resins other than the acid group-containing polyester which may be contained in the resin binder include known resins used for ordinary toners such as styrene-acryl copolymers, epoxy resins, polycarbonate resins and polyurethane resins.

The raw monomers of the acid group-containing polyester are not particularly limited, and there may be used known alcohol components and known carboxylic acid components such as carboxylic acids, carboxylic anhydrides and carboxylic acid esters.

Examples of the alcohol components include alkylene ($C_2$ to $C_3$) oxide adducts (average molar number of addition: 1 to 16) of bisphenol A such as polyoxypropylene-2,2-bis(4-hydroxyphenyl)propane and polyoxyethylene-2,2-bis(4-hydroxyphenyl)propane, ethylene glycol, propylene glycol, glycerol, pentaerythritol, trimethylol propane, hydrogenated bisphenol A, sorbitol, and alkylene ($C_2$ to $C_4$) oxide adducts (average molar number of addition: 1 to 16) of these alcohols.

These alcohol components may be used alone or in combination of any two or more thereof.

Examples of the carboxylic acid components include dicarboxylic acids such as phthalic acid, isophthalic acid, terephthalic acid, fumaric acid, maleic acid, adipic acid and succinic acid; succinic acids substituted with an alkyl group having 1 to 20 carbon atoms or an alkenyl group having 2 to 20 carbon atoms such as dodecenylsuccinic acid and octenylsuccinic acid; trivalent or higher-valent polycarboxylic acids such as trimellitic acid and pyromellitic acid; and anhydrides and alkyl ($C_1$ to $C_3$) esters of these acids. In the present invention, among these carboxylic acid components, from the viewpoints of facilitated condensation reaction and well-controlled molecular weight of the resulting polyester, preferred are the trivalent or higher-valent polycarboxylic acids, and more preferred are trimellitic acid, trimellitic anhydride and alkyl ($C_1$ to $C_3$) esters of trimellitic acid.

These carboxylic acid components may be used alone or in combination of any two or more thereof.

The polyester may be produced, for example, by polycondensing the alcohol component and the carboxylic acid component in an inert gas atmosphere at a temperature of from about 180 to about 250° C. by using an esterification catalyst, if required.

Examples of the esterification catalyst usable in the above reaction include tin compounds such as dibutyl tin oxide and tin dioctylate, and titanium compounds such as titanium diisopropylate bistriethanol aminate. The amount of the esterification catalyst used is preferably from 0.01 to 1 part by weight and more preferably from 0.1 to 0.6 part by weight on the basis of 100 parts by weight of a sum of the alcohol component and the carboxylic acid component.

From the viewpoints of a good low-temperature fusing ability, a good anti-hot offset property and a good storage property of the resultant toner, the acid group-containing polyester preferably has a softening point of from 70 to 165° C. and a glass transition point of from 50 to 85° C. The acid value of the polyester is preferably from 6 to 35 mg KOH/g, more preferably from 10 to 35 mg KOH/g and even more preferably from 15 to 35 mg KOH/g from the viewpoint of facilitated production of an emulsion. The softening point or the acid value of the polyester may be desirably adjusted by controlling the proportion of the alcohol and carboxylic acid to be charged, the temperature and time used in the polycondensation reaction, etc.

From the viewpoint of a good anti-hot offset property and a good durability of the resultant toner, the number-average molecular weight of the acid group-containing polyester is preferably from 1,000 to 10,000 and more preferably from 2,000 to 8,000.

Meanwhile, in the present invention, as the polyester, there may be used not only unmodified polyesters but also modified polyesters obtained by modifying polyesters to such an extent that the polyesters are substantially free from deterioration in inherent properties thereof. Examples of the modified polyesters include polyesters grafted or blocked with phenol, urethane, epoxy, etc., by the methods described, for example, in JP 11-133668A, JP 10-239903A and JP 8-20636A, and composite resins containing two or more kinds of resin units including a polyester unit.

When the resin binder is in the form of a mixture of a plurality of resins, the softening point, glass transition point, acid value and number-average molecular weight of the resin binder respectively mean those characteristic values of a mixture of these resins. The respective characteristic values of the mixture are preferably the same as the corresponding values of the polyesters.

Further, from the viewpoints of a good low-temperature fusing ability, a good anti-hot offset property and a good durability of the toner, the resins may contain two kinds of polyesters which are different in softening point from each other in which one polyester (a) preferably has a softening point of not lower than 70° C. and lower than 115° C., and the other polyester (b) preferably has a softening point of from 115 to 165° C. The weight ratio of the polyester (a) to the polyester (b) (a/b) is preferably from 10/90 to 90/10 and more preferably from 50/50 to 90/10.

Aqueous Medium

The aqueous medium used for neutralizing the resin containing the acid group-containing polyester contains water as a main component. From the viewpoint of a good environmental suitability, the content of water in the aqueous medium is preferably 80% by weight or more, more preferably 90% by weight or more and most preferably 100% by weight.

On the other hand, if a water-soluble organic solvent such as ethyl acetate and methyl ethyl ketone (MEK) is used as a main component of the medium for neutralizing the resin containing the acid group-containing polyester therein, the resulting resin particle dispersion tends to become unstable provably owing to adverse influence of the solvent, although the particle size of the resin particles in the resin particle dispersion can be reduced. As a result, it may be difficult to well control aggregation between the resin particles when obtaining a toner by aggregating and coalescing the resin particles. The reason therefor is considered to be that a hydrophobic portion of the resin swelled with the solvent in the neutralizing step is exposed to a surface of the resin.

On the contrary, in the present invention, the resin is dispersed in the medium containing water as a main component, so that the resulting dispersion can be kept stable, and the aggregation between the resin particles can be readily controlled, thereby enabling production of toner particles having a small particle size and a sharp particle size distribution. Meanwhile, the stability of the dispersion may be determined by using as an index a critical aggregation concentration thereof. More specifically, as the critical aggregation concentration is decreased, the dispersion becomes more unstable and the resin particles therein are more readily aggregated together, so that it may be difficult to control aggregation between the resin particles. As a result of the study made by the present inventors, from the viewpoint of well controlling aggregation between the resin particles, namely in view of obtaining toner particles having a small particle size and a narrow particle size distribution, the critical aggregation concentration of the dispersion is preferably from 0.3 to 1.2 mol/L, more preferably from 0.3 to 1.0 mol/L and even more preferably from 0.4 to 0.8 mol/L. The "critical aggregation concentration" as used herein means a concentration at which aggregation of the resin particles in the resin dispersion is initiated when adding an aggregating agent thereto, and may be measured by the below-mentioned method.

Examples of components other than water which may be contained in the aqueous medium include water-soluble organic solvents such as methanol, ethanol, isopropanol, butanol, acetone, methyl ethyl ketone and tetrahydrofuran. Among these organic solvents, from the viewpoint of less inclusion into the toner, preferred are alcohol-based organic solvents incapable of dissolving the resin therein such as methanol, ethanol, isopropanol and butanol. In the present invention, the resin is preferably finely dispersed in water solely substantially without using any organic solvent, to form fine particles thereof.

Production of Resin Particle Dispersion

In the present invention, the resin containing the acid group-containing polyester is neutralized in the above aqueous medium to prepare a dispersion of the polyester-containing resin particles.

In addition to the above resin, various additives such as a colorant, a releasing agent and a charge control agent may be added, if required, to the resin particle dispersion obtained by dispersing the resin in the aqueous medium. In particular, when a metal salt is incorporated as the charge control agent into the resin particle dispersion, the resin can be crosslinked through the metal, so that the resulting toner is excellent in low-temperature fusing ability and anti-hot offset property, and a broader fusing range of the toner can be ensured.

Examples of the charge control agent include metal salts of benzoic acid, metal salts of salicylic acid, metal salts of alkylsalicylic acids, metal salts of catechol, metal-containing bisazo dyes, tetraphenyl borate derivatives, quaternary ammonium salts and alkyl pyridinium salts.

The content of the charge control agent in the resin particle dispersion is preferably 10 parts by weight or less, more preferably 5 parts by weight or less and even more preferably 3 parts by weight or less on the basis of 100 parts by weight of the resin binder constituting the resin particles from the viewpoint of a good charging property of the resulting toner. Also, when the charge control agent is contained in the dispersion, from the viewpoint of a good charging property of the resulting toner, the content of the charge control agent in the resin particle dispersion is preferably 0.01 part by weight or more.

Meanwhile, when the charge control agent is incorporated in the dispersion in which the resin particles are dispersed, from the viewpoint of a good dispersibility of the charge control agent therein, there are preferably used a method of previously melt-kneading the charge control agent and the resin binder constituting the resin particles together and then emulsifying the resulting kneaded material in an aqueous medium, and a method of dispersing the charge control agent in an aqueous medium to prepare a dispersion thereof and then adding the obtained dispersion of the charge control agent to a resin when the resin is emulsified in an aqueous medium.

The colorant is not particularly limited, and may be appropriately selected from known colorants according to the requirements. Specific examples of the colorant include various pigments such as carbon blacks, inorganic composite oxides, Chrome Yellow, Hansa Yellow, Benzidine Yellow, Threne Yellow, Quinoline Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, red iron oxide, Methylene Blue Chloride, Phthalocyanine Blue, Phthalocyanine Green and Malachite Green Oxalate; and various dyes such as acridine dyes, xanthene dyes, azo dyes, benzoquinone dyes, azine dyes, anthraquinone dyes, indigo dyes, thioindigo dyes, phthalocyanine dyes, Aniline Black dyes and thiazole dyes. These colorants may be used alone or in combination of any two or more thereof.

The content of the colorant in the resin particles is preferably 20 parts by weight or less and more preferably from 0.01 to 10 parts by weight on the basis of 100 parts by weight of the resin binder constituting the resin particles.

Examples of the releasing agent include low-molecular weight polyolefins such as polyethylene, polypropylene and polybutene; silicones exhibiting a softening point upon heating; fatty acid amides such as oleamide, erucamide, ricinolamide and stearamide; vegetable waxes such as carnauba wax, rice wax, candelilla wax, haze wax and jojoba oil; animal waxes such as beeswax; mineral and petroleum waxes such as montan wax, ozokerite, ceresin, paraffin wax, microcrystalline wax and Fischer-Tropsch wax; and the like. The releasing agent is preferably used in the form of a dispersion in an aqueous medium from the viewpoints of a good dispersibility and a good aggregation with the resin particles.

The content of the releasing agent in the resin particle dispersion is preferably from 1 to 20 parts by weight and more preferably from 2 to 15 parts by weight on the basis of 100 parts by weight of the resin binder constituting the resin particles in view of attaining good effects due to addition thereof and preventing adverse influence on a charging property of the toner.

In the present invention, when dispersing the resin in the aqueous medium, from the viewpoint of an enhanced dispersibility of the resin, a surfactant is allowed to be present in the dispersion in an amount of preferably 5 parts by weight or less, more preferably from 0.1 to 3.5 parts by weight and even more preferably from 0.1 to 3 parts by weight on the basis of 100 parts by weight of the resin binder constituting the resin particles.

Examples of the surfactant include anionic surfactants such as sulfate-based surfactants, sulfonate-based surfactants, phosphate-based surfactants and soap-based surfactants; cationic surfactants such as amine salt-type surfactants and quaternary ammonium salt-type surfactants; and non-ionic surfactants such as polyethylene glycol-based surfactants, alkyl phenol ethyleneoxide adduct-based surfactants and polyhydric alcohol-based surfactants. Among these surfactants, preferred are ionic surfactants such as anionic surfactants and cationic surfactants. Specific examples of the anionic surfactants include dodecylbenzenesulfonic acid, sodium dodecylbenzenesulfonate, sodium dodecylsulfate, sodium alkylethersulfates, sodium alkylnaphthalenesulfonates and sodium dialkylsulfosuccinates. Specific examples of the cationic surfactants include alkylbenzenedimethyl ammonium chlorides, alkyltrimethyl ammonium chlorides and distearyl ammonium chloride. The nonionic surfactant is preferably used in combination with the anionic surfactant or the cationic surfactant. These surfactants may be used alone or in combination of any two or more thereof.

When neutralizing and dispersing the resin, an aqueous alkali solution is preferably added to the resin to disperse the resin together with optional additives therein.

The aqueous alkali solution used for dispersing the resin preferably has a concentration of from 1 to 20% by weight, more preferably from 1 to 10% by weight and even more preferably from 1.5 to 7.5% by weight. As the alkali of the aqueous alkali solution, there is preferably used such an alkali which allows a salt of the alkali and the polyester to exhibit an enhanced self-dispersibility. Specific examples of the alkali include hydroxides of a monovalent alkali metal such as potassium hydroxide and sodium hydroxide.

After dispersing the resin, preferably after neutralizing the resulting dispersion at a temperature not lower than a glass transition point of the resin constituting the resin particles, an aqueous medium is added to the dispersion at a temperature not lower than the glass transition point to prepare the resin dispersion.

The aqueous medium used for production of the resin dispersion may be the same aqueous medium as used above for neutralizing the polyester-containing resin. From the viewpoint of a good productivity, the aqueous medium added upon producing the resin dispersion is preferably the same aqueous medium as used for neutralizing the polyester-containing resin.

The rate of addition of the aqueous medium is preferably from 0.5 to 50 g/min, more preferably from 0.5 to 40 g/min and even more preferably from 0.5 to 30 g/min per 100 g of the resin constituting the resin particles from the viewpoint of reducing a particle size of the resulting resin particles. The rate of addition of the aqueous medium may be generally maintained until an O/W type emulsion is substantially formed. Therefore, the rate of addition of the aqueous medium after forming the O/W type emulsion is not particularly limited.

The amount of the aqueous medium added is preferably from 100 to 2,000 parts by weight and more preferably from 150 to 1,500 parts by weight on the basis of 100 parts by weight of the resin constituting the resin particles from the viewpoint of obtaining uniform aggregated particles in the subsequent aggregating treatment.

From the viewpoint of preparing a dispersion in which fine resin particles are dispersed, the above procedure for dispersing the resin in the aqueous medium is preferably conducted at a temperature not lower than a glass transition point of the resin binder constituting the resin particles and not higher than a softening point thereof. When the emulsifying and dispersing procedure is conducted in the above-specified temperature range, the resin can be smoothly emulsified and dispersed in the aqueous medium, and any special apparatus for heating is not required therein. From these viewpoints, the temperature used for emulsifying the resin is preferably not lower than the temperature higher by 10° C. than the glass transition point of the resin constituting the resin particles (hereinafter referred to as the "glass transition point of the resin+(plus) 10° C." but not higher than the "softening point of the resin−(minus) 5° C.".

The volume median particle size ($D_{50}$) of the resin particles contained in the thus obtained resin particle dispersion is preferably from 0.05 to 0.7 μm, more preferably from 0.1 to 0.7 μm, even more preferably from 0.1 to 0.5 μm and further even more preferably from 0.1 to 0.4 μm for the purpose of uniform aggregation of the resin particles in the subsequent aggregating treatment. The volume median particle size ($D_{50}$) as used herein means a particle size at which a cumulative volume frequency calculated on the basis of a volume fraction of particles from a smaller particle size side thereof is 50%. The volume median particle size ($D_{50}$) may be measured by the below-mentioned method.

The concentration of the resin particles in the resin particle dispersion is preferably from 5 to 50% by weight, more preferably from 5 to 40% by weight and even more preferably from 10 to 35% by weight from the viewpoints of a good stability of the dispersion and uniform adhesion of the resin particles to aggregated particles.

As an alternative method for obtaining the resin particle dispersion containing the resin particles, there may be used the method of emulsifying and dispersing polycondensable monomers as raw materials of the aimed resin particles in an aqueous medium, for example, by applying a mechanical shearing force or an ultrasonic wave thereto. In this method, if required, additives such as a polycondensation catalyst and a surfactant may also be added to a water-soluble medium. The polycondensation reaction of the monomers is allowed to proceed, for example, by heating the obtained solution. For example, when using a polyester as the resin, there may be used the same polycondensable monomers and polycondensation catalysts for polyesters as described above, and as the surfactant, there may also be used the same surfactants as described above.

The polymerization of the polycondesable monomers for producing the resin by polycondensation thereof is usually accompanied with a dehydration reaction and, therefore, does not principally proceed in the aqueous medium. However, for example, when the polycondesable monomers are emulsified in the aqueous medium in the presence of a surfactant capable of forming a micelle in the aqueous medium, the monomers are present in a micro hydrophobic site in the micelle and subjected to dehydration reaction therein to produce water. By discharging the thus produced water into the aqueous medium outside of the micelle, the polymerization of the monomers can be allowed to proceed. Thus, it is possible to produce the aimed dispersion in which the resin particles formed of the resin obtained by polycondensation are emulsified and dispersed in the aqueous medium, even under a low energy condition.

(Step (B))

In the step (B), the resin particle dispersion obtained in the step (A) is mixed with an oxazoline group-containing polymer at a temperature of from 60 to 100° C.

Oxazoline Group-Containing Polymer

As the oxazoline group-containing polymer, there are used those polymers containing two or more oxazoline groups in a molecule thereof. These polymers are capable of undergoing a crosslinking reaction with the resin containing an acid group such as a carboxyl group which constitutes the resin particles. The resin particles subjected to the crosslinking reaction are increased in molecular weight and softening point. Therefore, occurrence of the crosslinking reaction may be determined by measuring the softening point of the resin particles before subjected to the crosslinking reaction and the softening point of the resin particles after subjected to the crosslinking reaction, i.e., the softening point of the crosslinked resin particles.

In the present invention, the oxazoline group-containing polymer is preferably used from the viewpoint of an enhanced crosslinking reactivity with the acid group-containing resin constituting the resin particles. The oxazoline group-containing polymer may be obtained, for example, by polymerizing an oxazoline group-containing polymerizable monomer or by copolymerizing the oxazoline group-containing polymerizable monomer with the other polymerizable monomer which is copolymerizable therewith, if required.

The oxazoline group-containing polymerizable monomer is not particularly limited. Examples of the oxazoline group-containing polymerizable monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline and 2-isopropenyl-5-ethyl-2-oxazoline. These oxazoline group-containing polymerizable monomers may be used alone or in combination of any two or more thereof. Among these oxazoline group-containing polymerizable monomers, 2-isopropenyl-2-oxazoline is preferred from the viewpoint of a good industrial availability.

Among the polymerizable monomers which are copolymerizable with the oxazoline group-containing polymerizable monomer, those polymerizable monomers containing no oxazoline group are not particularly limited. Examples of the polymerizable monomers containing no oxazoline group include (meth)acrylic acid esters such as methyl(meth)acrylate, ethyl(meth)acrylate, n-butyl(meth)acrylate, isobutyl(meth)acrylate, t-butyl(meth)acrylate, cyclohexyl(meth)acrylate, 2-ethylhexyl(meth)acrylate, methoxy polyethylene glycol(meth)acrylate, lauryl(meth)acrylate, stearyl(meth)acrylate, 2-hydroxyethyl(meth)acrylate, 2-hydroxypropyl(meth)acrylate, a monoester of (meth)acrylic acid and polyethylene glycol, 2-aminoethyl(meth)acrylate and salts thereof, caprolactone-modified (meth)acrylic acids, (meth)acrylic acid-2,2,6,6-tetramethyl piperidine and (meth)acrylic acid-1,2,2,6,6-pentamethyl piperidine; (meth)acrylic acid salts such as sodium(meth)acrylate, potassium (meth)acrylate and ammonium (meth)acrylate; unsaturated nitriles such as acrylonitrile and methacrylonitrile; unsaturated amides such as (meth)acrylamide, N-methylol(meth)acrylamide and N-(2-hydroxyethyl)(meth)acrylamide; vinyl esters such as vinyl acetate and vinyl propionate; vinyl ethers such as methyl vinyl ether and ethyl vinyl ether; α-olefins such as ethylene and propylene; halogen-containing α,β-unsaturated aliphatic hydrocarbons such as vinyl chloride, vinylidene chloride and vinyl fluoride; and α,β-unsaturated aromatic hydrocarbons such as styrene, divinyl benzene, α-methyl styrene and sodium styrenesulfonate.

The content of the oxazoline group in the oxazoline group-containing polymer is preferably from 0.0001 to 0.01 mol/g (oxazoline value: from 100 to 10,000 g/equivalent) and more preferably from 0.0005 to 0.01 mol/g (oxazoline value: from 100 to 2,000 g/equivalent) from the viewpoint of an enhanced crosslinking reactivity with the acid group-containing polyester.

Examples of commercially available products of the oxazoline group-containing polymer include EPOCROSS WS series (water-soluble type) and K series (emulsion type) available from Nippon Shokubai Co., Ltd. Among these products, from the viewpoint of an enhanced crosslinking reactivity with the acid group-containing resin constituting the resin particles, preferred are EPOCROSS WS series of a water-soluble type.

When mixing the resin particle dispersion obtained in the step (A) with the oxazoline group-containing polymer, from the viewpoint of an enhanced crosslinking reactivity between the polyester and the oxazoline group-containing polymer, the resin particle dispersion to which the oxazoline group-containing polymer is added is heated at a temperature of from 60 to 100° C. and preferably from 80 to 100° C. By conducting the mixing procedure in the above-specified temperature range, the crosslinking reaction between the acid-group-containing resin in the resin particles and the functional group of the oxazoline group-containing polymer can be promoted, so that the resulting crosslinked resin particles can be increased in molecular weight and can exhibit a high softening point as compared to those of the non-crosslinked resin particles. The mixing of the resin particle dispersion with the oxazoline group-containing polymer at a temperature of from 60 to 100° C. may be conducted either in the course of, simultaneously with or subsequent to the addition of the oxazoline group-containing polymer in the step (B).

More specifically, as the method of adding the oxazoline group-containing polymer to the resin particle dispersion, there may be used (1) the method in which the oxazoline group-containing polymer is added to and mixed with the resin particle dispersion in which the resin particles containing the acid group-containing polyester are dispersed, (2) the method in which an aqueous dispersion prepared by dispersing the oxazoline group-containing polymer in an aqueous medium and/or an aqueous solution prepared by dissolving the oxazoline group-containing polymer in an aqueous medium is added to and mixed with the resin particle dispersion in which the resin particles containing the acid group-containing polyester are dispersed, or the like. Among these methods, from the viewpoint of an enhanced crosslinking reactivity between the polyester and the oxazoline group-containing polymer, preferred is the method in which an aqueous solution prepared by dissolving the oxazoline group-containing polymer in an aqueous medium is added to the resin particle dispersion in which the resin particles containing the acid group-containing polyester are dispersed.

The oxazoline group-containing polymer may be added at one time or intermittently in plural divided parts. In the present invention, from the viewpoint of a good crosslinking reactivity, the oxazoline group-containing polymer is preferably added at one time.

In the present invention, the amount of the oxazoline group-containing polymer to be added to the resin particle dispersion may be determined according to a content of the functional group in the polymer used or a weight-average molecular weight of the polymer, an acid value of the acid group-containing resin, a composition of the aimed toner, etc. From the viewpoint of a broad fusing temperature range of the toner, for example, when using a carboxyl group-containing resin, the amount of the oxazoline group-containing polymer added to the resin particle dispersion is preferably 0.07 time or more, and more preferably 0.1 time or more the number of moles of a carboxyl group contained in the carboxyl group-containing resin. Also, from the viewpoint of good image characteristics of the resulting toner, the amount of the oxazoline group-containing polymer added to the resin particle dispersion is preferably 0.8 time or less, and more preferably 0.7 time or less the number of moles of a carboxyl group contained in the carboxyl group-containing resin.

Meanwhile, the amount of the oxazoline group-containing polymer added to the resin particle dispersion may be adjusted according to the amount of the crosslinked resin to be compounded in the resin binder constituting the toner. For example, when obtaining a toner containing the crosslinked resin derived from the above crosslinked resin particles in an amount of 90% or more based on the resin binder, the amount of the oxazoline group-containing polymer added to the resin particle dispersion is preferably from 0.07 to 0.40 time, more preferably from 0.10 to 0.30 time and even more preferably from 0.10 to 0.18 time the number of moles of a carboxyl group contained in the carboxyl group-containing resin. On the other hand, when obtaining a toner containing the crosslinked resin derived from the above crosslinked resin particles in an amount of less than 90% based on the resin binder, the amount of the oxazoline group-containing polymer added to the resin particle dispersion is preferably from 0.20 to 0.80 time, more preferably from 0.30 to 0.70 time and even more preferably from 0.40 to 0.60 time the number of moles of a carboxyl group contained in the carboxyl group-containing resin.

Meanwhile, the "number of moles of a carboxyl group contained in the carboxyl group-containing resin" as used herein means the value calculated from an acid value of the resin as measured under the conditions using a mixed solvent containing acetone and toluene at a volume ratio of 1:1 as a measuring solvent according to JIS K0070.

The amount of the oxazoline group-containing polymer added is preferably 0.1 part by weight or more, more preferably 0.5 part by weight or more, even more preferably 1 part by weight or more and further even more preferably 2 parts by weight or more on the basis of 100 parts by weight of the resin binder constituting the resin particles from the viewpoint of a good crosslinking reactivity. Also, from the viewpoint of a good low-temperature fusing ability of the resulting toner, the amount of the oxazoline group-containing polymer added is preferably 20 parts by weight or less, more preferably 10 parts by weight or less and even more preferably 8 parts by weight or less on the basis of 100 parts by weight of the resin binder. From these viewpoints, the amount of the oxazoline group-containing polymer added is preferably from 0.1 to 20 parts by weight, more preferably from 0.5 to 10 parts by weight, even more preferably from 1 to 10 parts by weight and further even more preferably from 2 to 8 parts by weight on the basis of 100 parts by weight of the resin binder constituting the resin particles.

When using the oxazoline group-containing polymer in the form of an aqueous dispersion prepared by dispersing the polymer in an aqueous medium and/or an aqueous solution prepared by dissolving the polymer in an aqueous medium, the concentration of solid components in the aqueous dispersion and/or the aqueous solution is preferably from 5 to 40% by weight and more preferably from 10 to 35% by weight from the viewpoint of a good crosslinking reactivity between the polyester and the oxazoline group-containing polymer.

The rate of addition of the oxazoline group-containing polymer is not particularly limited. When the temperature of the resin dispersion exceeds 25° C., the rate of addition of the oxazoline group-containing polymer is preferably adjusted to from 0.05 to 3 parts by weight/min, more preferably from 0.05 to 2.5 parts by weight/min and even more preferably from 0.01 to 2 parts by weight/min on the basis of 100 parts by weight of the resin binder contained in the resin particles from the viewpoint of a good crosslinking reactivity. The oxazoline group-containing polymer may be added at one time or intermittently in plural divided parts, or in further divided parts for each addition.

When adding and mixing the oxazoline group-containing polymer in the form of an aqueous dispersion prepared by dispersing the polymer in an aqueous medium and/or an aqueous solution prepared by dissolving the polymer in an aqueous medium, the temperature of the aqueous dispersion of the polymer and/or the aqueous solution of the polymer upon addition thereof is preferably maintained in the range of from 5 to 30° C. and more preferably from 10 to 30° C. from the viewpoint of a good crosslinking reactivity. Meanwhile, the term "mixing and adding" as used herein is intended to involve the case where the aqueous dispersion and/or aqueous solution is mixed while being added, the case where it is mixed after being added, etc.

(Dispersion of Crosslinked Resin Particles)

The crosslinked resin particles contained in the crosslinked resin particle dispersion preferably have a softening point of from 108 to 220° C., more preferably from 110 to 220° C. and even more preferably from 110 to 200° C. from the viewpoint of a good fusing ability of the resulting toner. The toner obtained by using the crosslinked resin particles can exhibit a broad fusing temperature range.

The volume median particle size ($D_{50}$) of the crosslinked resin particles contained in the thus obtained the crosslinked resin particle dispersion is preferably from 0.05 to 0.7 μm, more preferably from 0.1 to 0.7 μm, even more preferably from 0.1 to 0.5 μm and further even more preferably from 0.1 to 0.4 μm for the purpose of allowing the resin particles to undergo uniform aggregation in the subsequent aggregation treatment.

The crosslinked resin particle dispersion according to the present invention may also contain, in addition to the crosslinked resin particles, the resin particles obtained by neutralizing the resin containing the acid group-containing polyester in an aqueous medium, and the oxazoline group-containing polymer bonded to the acid group of the polyester.

The resin particle dispersion obtained by neutralizing and dispersing the resin containing the acid group-containing polyester in an aqueous medium and the oxazoline group-containing polymer bonded to the acid group of the polyester are the same as described above. The bonding between the acid group of the polyester and the oxazoline group may be identified by analysis of an amide group in the resulting resin. Meanwhile, in order to improve a detection sensitivity, insoluble components which are obtained by subjecting the resin to Soxhlet extraction using THF may be analyzed after being dried, by FT-IR ATR (attenuation total reflection) method.

The crosslinked resin particle dispersion according to the present invention may be suitably used in the method for producing toner particles by aggregating and coalescing the crosslinked resin particles. By using the crosslinked resin particle dispersion in such a method, it is possible to obtain a toner which is excellent in low-temperature fusing ability, anti-hot offset property, anti-offset property, etc.

In the present invention, the toner may be produced (i) by directly aggregating and coalescing the crosslinked resin particles contained in the crosslinked resin particle dispersion, (ii) by aggregating and coalescing the crosslinked resin particles used as either core particles or shell particles of core/shell particles, (iii) by aggregating and coalescing the crosslinked resin particles used as both core particles and shell particles of core/shell particles, etc.

[Process for Producing Dispersion of Crosslinked Resin Particles]

The present invention also relates to a process for producing a dispersion of crosslinked resin particles having a volume median particle size ($D_{50}$) of from 0.05 to 0.7 μm, which includes the steps of:

(A) neutralizing a resin containing an acid group-containing polyester in an aqueous medium to obtain a dispersion of resin particles; and (B) mixing the dispersion of resin particles obtained in the step (A) with an oxazoline group-containing polymer at a temperature of from 60 to 100° C.

The steps (A) and (B) are respectively the same as described above.

[Toner for Electrophotography]

The toner for electrophotography according to the present invention is obtained by aggregating and coalescing the crosslinked resin particles contained in the above crosslinked resin particle dispersion.

(Aggregating Step)

In the aggregating step, in order to effectively carry out the aggregation, an aggregating agent is preferably added. Examples of the aggregating agent used in the present invention include organic aggregating agents such as a cationic surfactant in the form of a quaternary salt and polyethyleneimine, and inorganic aggregating agents such as an inorganic metal salt, an inorganic ammonium salt and a divalent or higher-valent metal complex. The inorganic metal salts include, for example, metal salts such as sodium sulfate, sodium chloride, calcium chloride, calcium nitrate, barium chloride, magnesium chloride, zinc chloride, aluminum chloride and aluminum sulfate; and inorganic metal salt polymers such as poly(aluminum chloride), poly(aluminum hydroxide) and calcium polysulfide. In the present invention, from the viewpoints of controlling a particle size of the toner with a high accuracy and achieving a sharp particle size distribution thereof, a monovalent salt is preferably used as the aggregating agent. The "monovalent salt" as used herein means that a valence of a metal ion or a cation constituting the salt is 1. Examples of the monovalent salt as the aggregating agent include organic aggregating agents such as cationic surfactants in the form of a quaternary salt, and inorganic aggregating agents such as inorganic metal salts and ammonium salts. In the present invention, among these aggregating agents, water-soluble nitrogen-containing compounds having a molecular weight of 350 or less are preferably used from the viewpoints of controlling a particle size of the toner with a high accuracy and achieving a sharp particle size distribution thereof.

The water-soluble nitrogen-containing compounds having a molecular weight of 350 or less are preferably acidic compounds in order to rapidly aggregate the resin particles. The pH value of an aqueous solution containing 10% by weight of the water-soluble nitrogen-containing compound is preferably from 4 to 6 and more preferably from 4.2 to 6 as measured at 25° C. Also, from the viewpoints of a good charging property under high-temperature and high-humidity conditions, etc., the water-soluble nitrogen-containing compounds more preferably have a molecular weight of 300 or less. Examples of the water-soluble nitrogen-containing compounds include ammonium salts such as ammonium halides, ammonium sulfate, ammonium acetate, ammonium benzoate and ammonium salicylate; and quaternary ammonium salts such as tetraalkyl ammonium halides. From the viewpoint of a good productivity, among these compounds, preferred are ammonium sulfate (pH value of 10 wt % aqueous solution at 25° C. (hereinafter referred to merely as a "pH"): 5.4), ammonium chloride (pH: 4.6), tetraethyl ammonium bromide (pH: 5.6) and tetrabutyl ammonium bromide (pH: 5.8).

The amount of the aggregating agent used may vary depending upon a valence of ionic charge of the aggregating agent used. The monovalent aggregating agent is preferably used in an amount of from 2 to 50 parts by weight, more preferably from 3.5 to 40 parts by weight and even more preferably from 3.5 to 30 parts by weight on the basis of 100 parts by weight of the resin binder constituting the crosslinked resin particles from the viewpoint of a good aggregating property.

In order to ensure uniform aggregation of the crosslinked resin particles, the aggregating agent is desirably added after suitably controlling the pH value of the reaction system and at a temperature not higher than a glass transition point of the resin binder constituting the crosslinked resin particles and preferably at a temperature not higher than the "glass transition temperature of the resin binder–(minus) 10° C.". The aggregating agent may be added in the form of a solution thereof in an aqueous medium. In addition, the aggregating agent may be added at one time, or intermittently or continuously. Further, upon and after adding the aggregating agent, the obtained dispersion is preferably fully stirred.

Both in the case where the aggregated particles are directly subjected to the subsequent coalescing step for producing toner particles and in the case where the aggregated particles or coalesced particles are used as core particles together with the other resin particles or crosslinked resin particles as shell particles for producing toner particles, the volume median particle size ($D_{50}$) of the aggregated particles is preferably from 1 to 10 μm, more preferably from 2 to 8 μm, even more preferably from 3 to 8 μm and further even more preferably from 3 to 6 μm from the viewpoint of a high image quality.

The concentration of the aggregated particles in the dispersion is preferably from 5 to 50% by weight and more preferably from 5 to 40% by weight from the viewpoints of a good productivity and well-controlled aggregation.

Further, in the aggregating step, from the viewpoint of well-controlled particle size of the resulting toner particles, a surfactant is preferably added to the dispersion. More preferably, at least one compound selected from the group consisting of alkylethersulfates represented by the following formula (1), alkylsulfates and straight-chain alkylbenzenesulfonates is added to the dispersion.

$$R-O-(CH_2CH_2O)_n SO_3M \quad (1)$$

wherein R represents an alkyl group; n represents an average molar number of addition and is a number of from 0 to 15; and M represents a monovalent cation.

In the formula (1), the alkyl group represented by R preferably has from 6 to 20 carbon atoms, more preferably from 8 to 18 carbon atoms and even more preferably from 8 to 15 carbon atoms from the viewpoints of a good adsorption to the aggregated particles and a small residual amount in the toner. Specific examples of the alkyl group include an octyl group, a decyl group, a dodecyl group, a tetradecyl group, a pentadecyl group and an octadecyl group. The suffix n represents an average molar number of addition and is a number of from 1 to 15. From the viewpoint of a well-controlled particle size of the resulting particles, n is preferably from 1 to 10 and more preferably from 1 to 5. M represents a monovalent cation. From the viewpoint of a well-controlled particle size of the resulting particles, M is preferably sodium, potassium or ammonium, and more preferably sodium or ammonium.

The straight-chain alkylbenzenesulfonates are not particularly limited. From the viewpoints of a good adsorption to the aggregated particles and a small residual amount in the toner, the straight-chain alkylbenzenesulfonates are preferably those compounds represented by the following formula (2):

$$R\text{-}Ph\text{-}SO_3M \quad (2)$$

wherein R represents a straight-chain alkyl group; Ph represents a phenyl group; and M represents a monovalent cation.

The straight-chain alkyl group represented by R may be the same as those which have a straight chain among the alkyl groups exemplified as R in the formula (1). Examples of the straight-chain alkyl group include an octyl group, a decyl group, a dodecyl group, a tetradecyl group and an octadecyl group. As the suitable straight-chain alkylbenzenesulfonates, there may be used sodium sulfate salts thereof.

The above alkylethersulfates, alkylsulfates and straight-chain alkylbenzenesulfonates may be respectively used alone or in combination of any two or more thereof.

The at least one compound selected from the group consisting of alkylethersulfates, alkylsulfates and straight-chain alkylbenzenesulfonates is preferably added in an amount of from 0.1 to 15 parts by weight, more preferably from 0.1 to 10 parts by weight and even more preferably from 0.1 to 8 parts by weight on the basis of 100 parts by weight of the resin constituting the aggregated particles from the viewpoints of a good aggregation stopping property and a small residual amount in the toner. These compounds may be added in any configuration as long as the amount of the compound added lies within the above-specified range. From the viewpoint of a good productivity, the compounds may be added in the form of an aqueous solution thereof. The respective salt compounds may be added at one time, intermittently or continuously.

(Coalescing Step)

In the coalescing step, the dispersion of the aggregated particles obtained in the aggregating step is heated to obtain coalesced particles.

The heating temperature used in the coalescing step is preferably not lower than the glass transition point of the resin constituting the crosslinked resin particles, i.e., the resin binder constituting the resin particles but not higher than the "softening point of the resin+(plus) 20° C."; more preferably not lower than the "grass transition point of the resin+(plus) 5° C." but not higher than the "softening point of the resin+(plus) 15° C."; and even more preferably not lower than the "grass transition point of the resin+(plus) 10° C." but not higher than the "softening point of the resin+(plus) 10° C." from the viewpoints of controlling a particle size, a particle size distribution and a shape of the toner as aimed, and attaining a good fusibility between the crosslinked resin particles and the core particles which are contained in the core particles to which the crosslinked resin particles adhere.

The thus obtained coalesced particles may be subjected to a liquid-solid separation step such as filtration, a washing step, a drying step, etc., thereby obtaining toner particles. In the washing step, the coalesced particles are preferably washed with an acid to remove metal ions from the surface of the respective toner particles for the purpose of ensuring a sufficient charging property and a good reliability of the resultant toner.

In addition, in the drying step, any optional methods such as vibration-type fluidization drying method, spray-drying method, freeze-drying method and flash jet method may be employed. The water content in the toner particles obtained after the drying step is preferably adjusted to 1.5% by weight or less and more preferably 1.0% by weight or less from the viewpoint of a good charging property of the resulting toner.

From the viewpoint of a high image quality, the volume median particle size ($D_{50}$) of the coalesced particles is preferably from 1 to 10 μm, more preferably from 2 to 8 μm and even more preferably from 3 to 8 μm.

Moreover, the toner for electrophotography according to the present invention is preferably produced by coalescing the aggregated particles to which the (crosslinked) resin particles adhere and/or the coalesced particles to which the (crosslinked) resin particles adhere (both occasionally collectively referred to merely as "core particles to which the (crosslinked) resin particles adhere") which are obtained by mixing the dispersion of the aggregated particles and/or the coalesced particles (the aggregated particles and/or the coalesced particles are occasionally referred to merely as "core particles") with the crosslinked resin particle dispersion and/or the resin particle dispersion (the resin particles contained in the crosslinked resin particle dispersion and/or the resin particle dispersion which are to be mixed with the core particles are occasionally referred to merely as "shell particles"). The "(crosslinked) resin particles" as used herein mean crosslinked resin particles, non-crosslinked resin particles or both of these particles (this definition is also applied to the subsequent descriptions).

Meanwhile, the crosslinked resin particle dispersion and the resin particle dispersion used in the above procedure may be the same as or different from the resin particle dispersion used for preparing the above aggregated particles and/or coalesced particles.

The time of addition of the dispersion of the (crosslinked) resin particles and the amount of the (crosslinked) resin particles added may be appropriately controlled according to the volume median particle size ($D_{50}$) of the toner as aimed. For example, in the emulsification and aggregation method, in order to obtain a toner having a volume median particle size ($D_{50}$) of 5 μm which is obtained by forming a 1 μm-thick coating layer of the (crosslinked) resin particles on a surface of the respective core particles constituted from the aggregated particles, the (crosslinked) resin particles may be added in an amount corresponding to the 1 μm-thick coating layer thereof to the aggregated particles when the aggregated particles are respectively grown into those having a particle size of 4 μm.

From the viewpoint of a high image quality, the volume median particle size ($D_{50}$) of the core particles to which the (crosslinked) resin particles adhere is preferably from 1 to 10 μm, more preferably from 2 to 10 μm and even more preferably from 3 to 10 μm.

From the viewpoint of uniform charging property of the resulting toner, the proportion of the (crosslinked) resin particle dispersion added to the core particles is adjusted such that the resin contained in the (crosslinked) resin particles is added in an amount of preferably from 5 to 100 parts by weight, more preferably from 10 to 90 parts by weight and even more preferably from 20 to 80 parts by weight on the basis of 100 parts by weight of the resin contained in the core particles.

The (crosslinked) resin particle dispersion may be added to the core particle dispersion at one time or intermittently in plural divided parts. In the present invention, from the viewpoint of obtaining a toner having a narrow particle size distribution, the (crosslinked) resin particle dispersion is preferably added intermittently in plural divided parts.

When adding the (crosslinked) resin particle dispersion at one time or intermittently in plural divided parts, the aggregating agent may be added in the following manner. That is, when the amount of the resin constituting the (crosslinked) resin particles added is less than 30 parts by weight on the basis of 100 parts by weight of the resin contained in the core particles, from the viewpoint of well-controlled particle size distribution of the core particles to which the (crosslinked) resin particles adhere, addition of the aggregating agent may be optional. On the other hand, when the (crosslinked) resin particle dispersion is added in an amount of 30 parts by weight or more, it is desirable to add the aggregating agent from the viewpoint of a good aggregating property and well-controlled particle size distribution of the core particles to which the (crosslinked) resin particles adhere. In this case, it is preferred that the (crosslinked) resin particles and the aggregating agent be each independently added at the same time or added alternately, and it is more preferred that these components be each independently added at the same time.

When the (crosslinked) resin particle dispersion is added intermittently in plural divided parts, the amounts of the (crosslinked) resin particles contained in the respective divided parts of the dispersions are preferably identical to each other. Also, when the aggregating agent is added intermittently in plural divided parts, the amounts of the aggregating agent contained in the respective divided parts thereof are preferably identical to each other. In addition, when the (crosslinked) resin particle dispersion is added intermittently in plural divided parts, the number of addition steps of the dispersion is not particularly limited, and is preferably from 2 to 10 and more preferably from 2 to 8 from the viewpoints of well-controlled particle size distribution of the resulting core particles to which the (crosslinked) resin particles adhere and a good productivity.

Meanwhile, in the present invention, when the (crosslinked) resin particle dispersion is continuously added for a predetermined period of time, the continuous addition is regarded as one addition step.

Further, when the core particles are prepared by the emulsification and aggregation method, from the viewpoint of a good aggregating property and well-controlled particle size distribution of the core particles to which the (crosslinked) resin particles adhere, the respective dispersions formed by adding the respective divided parts of the (crosslinked) resin particle dispersion to the core particle dispersion are preferably aged after each addition for a period of from 5 to 15 min, more preferably from 5 to 30 min and even more preferably from 5 to 120 min. It is particularly preferred that the aging for the above-specified period of time be conducted after all of the addition steps of the plural divided parts. Meanwhile, the aging time means a period of time which elapses from completion of addition of one divided part of the aggregating agent and/or the (crosslinked) resin particle dispersion up to initiation of addition of the next divided part thereof.

The amount of the aggregating agent added is preferably from 1 to 30 parts by weight, more preferably from 2 to 28 parts by weight and even more preferably from 3 to 25 parts by weight on the basis of 100 parts by weight of the (crosslinked) resin particles from the viewpoints of reduction in particle size of the resulting toner particles and a narrow particle size distribution thereof. Meanwhile, the aggregating agent used may be the same as the aggregating agent used in the previous aggregating step. The aggregating agent is preferably added in the form of an aqueous solution prepared by dissolving the aggregating agent in an aqueous medium.

The dispersion containing the core particles is added while maintaining the dispersion at a temperature of preferably from (T1−25) to (T1+5)° C., more preferably from (T1−25) to T1° C. and even more preferably from (T1−20) to T1° C., thereby enabling production of the core particles to which the (crosslinked) resin particles adhere which have an excellent imaging performance. Meanwhile, T1 means a lower one of glass transition points of the resin constituting the core particles and the resin constituting the (crosslinked) resin particles. For example, (T1−25)° C. means a temperature lower by 25° C. than the lower glass transition point T1.

In the preferred embodiment of the present invention, when the volume median particle size ($D_{50}$) of the core particles is from 2 to 6 μm and the volume median particle size ($D_{50}$) of the (crosslinked) resin particles is from 0.12 to 0.18 μm, from the viewpoints of achieving a narrow particle size distribution of the resulting toner particles and a good productivity, the (crosslinked) resin particles are added to the core particles at such a rate that the amount of the resin constituting the (crosslinked) resin particles added is preferably from 0.01 to 3 parts by weight/min, more preferably from 0.01 to 2 parts by weight/min and even more preferably from 0.01 to 1.0 part by weight/min on the basis of 100 parts by weight of the resin constituting the core particles.

The rate of addition of the (crosslinked) resin particle dispersion may vary depending upon the volume median particle size ($D_{50}$) of the core particles and the volume median particle size ($D_{50}$) of the (crosslinked) resin particles. When the difference in particle size between the core particles and the (crosslinked) resin particles is as large as 10 times or more as compared to that exemplified above, the addition rate is preferably controlled to a smaller value. Whereas, when the difference in particle size between the core particles and the (crosslinked) resin particles is less than 10 times, the addition rate may be controlled to a larger value.

In addition, when the difference between a solid concentration of the core particle dispersion (amount of the core particles) and a solid concentration of the (crosslinked) resin particle dispersion (amount of the (crosslinked) resin particles) lies within 5% by weight, from the viewpoints of a good aggregating property and a good productivity, the (crosslinked) resin particle dispersion is added to the core particle dispersion at such a velocity that the amount of the resin constituting the (crosslinked) resin particles added is preferably from 0.05 to 2.0 parts by weight/min, more preferably from 0.05 to 1.5 parts by weight/min and even more preferably from 0.01 to 1.0 part by weight/min on the basis of 100 parts by weight of the resin contained in the core particles.

Next, the core particles to which the (crosslinked) resin particles adhere are preferably heated to coalesce a core particle portion of the respective core particles to which the (crosslinked) resin particles adhere and fuse the (crosslinked) resin particles with the core particles, thereby obtaining coalesced particles.

More specifically, it is suggested that by heating the core particles to which the (crosslinked) resin particles adhere wherein the bonding between the resin particles contained in the core particles constituted from the aggregated particles having a volume median particle size ($D_{50}$) of from 1 to 10 μm, between the (crosslinked) resin particles contained in the core particles to which the (crosslinked) resin particles adhere and between the core particles and the (crosslinked) resin particles contained in the core particles to which the (crosslinked) resin particles adhere, is mainly formed by simple physical attachment therebetween, the aggregated particles as the core particles are integrally coalesced together, and fusion between the (crosslinked) resin particles as well as between the core particles and the (crosslinked) resin particles occurs to integrate the respective particles, thereby forming the coalesced particles.

(Production of Core Particles to which (Crosslinked) Resin Particles Adhere)

The toner for electrophotography as aimed in the present invention can also be produced by mixing a dispersion containing core particles constituted from aggregated particles and/or coalesced particles other than the aggregated particles and/or the coalesced particles obtained from the crosslinked resin particle dispersion according to the present invention with the above dispersion of the (crosslinked) resin particles (also occasionally referred to merely as "shell particles"), and then coalescing the thus obtained core particles to which the (crosslinked) resin particles adhere.

The core particle dispersion used upon the above production procedure contains resin particles having a volume median particle size ($D_{50}$) of from 1 to 10 μm. As the method for producing the core particle dispersion, there may be used various methods including, for example, the method in which a composition of the core particles which contains a resin dissolved in a solvent is suspended in water, and then the solvent is distilled off from the resulting suspension to obtain the core particles; the emulsion polymerization and aggregation method in which resin particles obtained by emulsion polymerization are mixed with other materials such as a colorant, and then the resulting emulsified particles are aggregated and associated together to obtain resin particles as the core particles; the emulsification and aggregation method in which resin particles obtained by emulsifying the resin binder in the presence of a surfactant are mixed with other materials such as a colorant, and then aggregated and associated together to obtain the core particles; and the polymerization method in which the core particles are directly produced by suspension polymerization method. In the present invention, from the viewpoint of reduction in particle size of the resulting toner, the core particles obtained by the emulsification and aggregation method are preferably used.

The core particles obtained by the emulsification and aggregation method are in the form of aggregated particles produced by aggregating resin particles dispersed in an aqueous medium. The resin particles may be obtained in the same manner as used for production of the above crosslinked resin particles except that the step of adding the oxazoline group-containing polymer and mixing the polymer with the resin particle dispersion at a temperature of from 60 to 100° C. is not carried out.

The core particles may be either the aggregated particles themselves or coalesced particles obtained by coalescing the aggregated particles. The aggregated particles which are subjected to substantially no coalescence are preferably used as the core particles from the viewpoint of a good adhesion of the crosslinked resin particles thereto. In this case, the aggregation and coalescence for production of the core particles may be carried out substantially in the same manner as described above.

In the present invention, the core particles to which the crosslinked resin particles adhere are preferably produced by adding the crosslinked resin particle dispersion containing the crosslinked resin particles to the core particle dispersion containing the aggregated particles as the core particles.

(Toner for Electrophotography)

The toner for electrophotography according to the present invention has a broad fusing temperature range and is excellent in image characteristics.

The toner for electrophotography according to the present invention preferably has a softening point of from 60 to 140° C., more preferably from 60 to 130° C. and even more preferably from 60 to 120° C. from the viewpoint of a good low-temperature fusing ability. In addition, the toner preferably has a glass transition point of from 30 to 80° C. and more preferably from 40 to 70° C. from the viewpoint of a good durability thereof. Meanwhile, the softening point and the glass transition point of the toner may be measured according to the same methods as used above for measuring those of the resins.

The thus obtained toner may be directly used as a toner for electrophotography, or an external additive such as a fluidizing agent may be added to treat the surface of the toner particles therewith to obtain the toner for electrophotography. As the external additive, there may be used known fine particles. Examples of the fine particles as the external additive include inorganic fine particles such as fine silica particles whose surface is subjected to a hydrophobic treatment, fine titanium oxide particles, fine alumina particles, fine cerium oxide particles and carbon blacks; and fine polymer particles such as fine particles made of polycarbonates, polymethyl methacrylate, silicone resins, etc.

The amount of the external additive formulated is preferably from 1 to 8 parts by weight and more preferably from 1.5 to 5 parts by weight on the basis of 100 parts by weight of the toner (toner particles) before being treated with the external additive.

The volume median particle size ($D_{50}$) of the toner (particles) is preferably from 1 to 10 μm, more preferably from 2 to 8 μm and even more preferably from 3 to 7 μm from the viewpoint of a high image quality. The CV value of each of the above aggregated particles, coalesced particles, toner particles and toner is preferably 30 or less, more preferably 27 or less and even more preferably 25 or less. The toner of the present invention preferably exhibits the above particle size and CV value falling within the above-specified ranges. The particle size and particle size distribution of the toner (particles) may be measured by the below-mentioned methods. The CV value of each of the above aggregated particles, coalesced particles, toner particles and toner may be defined by the formula: [(Standard Deviation of Particle Size Distribution)/(Volume Median Particle Size ($D_{50}$))×100].

The toner for electrophotography obtained according to the present invention can be used as one-component system developer, or can be mixed with a carrier to form a two-component system developer.

[Process for Producing Toner for Electrophotography]

The present invention also relates to a process for producing a toner for electrophotography which includes the steps of (a) obtaining a dispersion of crosslinked resin particles by the process for producing the dispersion of crosslinked resin particles as defined above; and (b) aggregating and coalescing the crosslinked resin particles contained in the dispersion of crosslinked resin particles obtained in the step (a).

The steps (a) and (b) are respectively the same as those described above.

EXAMPLES

In the following Examples, etc., various properties were measured and evaluated by the following methods.

[Acid Value of Resins]

Determined according to JIS K0070. However, as the solvent for the measurement, there was used a mixed solvent containing acetone and toluene at a volume ratio of 1:1.

[Softening Point and Glass Transition Point of Resins and Toner (Particles)]

(1) Softening Point

Using a flow tester "CFT-500D" available from Shimadzu Corporation, 1 g of a sample was extruded through a nozzle having a die pore diameter of 1 mm and a length of 1 mm while heating the sample at a temperature rise rate of 6° C./min and applying a load of 1.96 MPa thereto by a plunger.

The softening point was determined as the temperature at which a half amount of the sample was flowed out when plotting a downward movement of the plunger of the flow tester relative to the temperature.

(2) Glass Transition Point

Using a differential scanning calorimeter ("DSC 210" commercially available from Seiko Instruments & Electronic, Ltd.), a sample was heated to 200° C. and then cooled from 200° C. to −10° C. at a temperature drop rate of 10° C./min, and thereafter heated again at a temperature rise rate of 10° C./min to prepare a characteristic curve thereof. When a peak was observed at a temperature lower by 20° C. or more than the softening point, the peak temperature was read as the glass transition point. Whereas, when a shift of the characteristic curve was observed without any peaks at the temperature lower by 20° C. or more than the softening point, the temperature at which a tangential line having a maximum inclination of the curve in the portion of the curve shift was intersected with an extension of the baseline on the high-temperature side of the curve shift was read as the glass transition point. Meanwhile, the glass transition point is a property inherent to a non-crystalline portion of the resin, which may be generally observed in a non-crystalline polyester, but may also be observed in a non-crystalline portion of a crystalline polyester, if any, in some cases.

[Softening Point and Glass Transition Point of Resin Particles or Crosslinked Resin Particles]

Using a freeze dryer ("FDU-2100" and "DRC-1000" both available from Tokyo Rika Kikai Co., Ltd.), 30 g of the dispersion was vacuum-dried at −25° C. for 1 h, at −10° C. for 10 h and then at 25° C. for 4 h until the water content therein reached 1% by weight or less.

Using an infrared moisture meter "FD-230" available from Kett Electric Laboratory, 5 g of the sample obtained after being dried was subjected to measurement of a water content (% by weight) thereof at a drying temperature of 150° C. under a measuring mode 96 (monitoring time: 2.5 min/variation range: 0.05%).

The softening point and glass transition point of the particles contained in the thus dried dispersion were measured by the above methods.

[Number-Average Molecular Weight of Resins]

The number-average molecular weight was calculated from the molecular weight distribution measured by gel permeation chromatography according to the following method.

(1) Preparation of Sample Solution

The resin was dissolved in chloroform to prepare a solution having a concentration of 0.5 g/100 mL. The resulting solution was then filtered through a fluororesin filter ("FP-200" commercially available from Sumitomo Electric Industries, Ltd.) having a pore size of 2 μm to remove insoluble components therefrom, thereby preparing a sample solution.

(2) Measurement of Molecular Weight Distribution

Using the below-mentioned apparatus, chloroform was allowed to flow through a column at a flow rate of 1 mL/min, and the column was stabilized in a thermostat at 40° C. One hundred microliters of the sample solution was injected to the column to determine a molecular weight distribution of the sample. The molecular weight of the sample was calculated on the basis of a calibration curve previously prepared. The calibration curve of the molecular weight was prepared by using several kinds of monodisperse polystyrenes (those polystyrenes having molecular weights of $2.63 \times 10^3$, $2.06 \times 10^4$ and $1.02 \times 10^5$ available from Toso Company Ltd.; and those polystyrenes having molecular weights of $2.10 \times 10^3$, $7.00 \times 10^3$ and $5.04 \times 10^4$ available from GL Science Inc.) as standard samples.

Analyzer: CO-8010 (commercially available from Toso Company Ltd.)

Column: GMHLX+G3000HXL (commercially available from Toso Company Ltd.)

[Particle Size of Resin Particles, Crosslinked Resin Particles and Releasing Agent Fine Particles]

(1) Measuring Apparatus: Laser scattering-type particle size analyzer ("LA-920" commercially available from Horiba Ltd.)

(2) Measuring Conditions: Using a cell for the measurement which was filled with distilled water, a volume median particle size ($D_{50}$) of the particles was measured at a temperature at which an absorbance thereof was within an adequate range.

[Solid Concentration of Dispersion]

Using an infrared moisture meter "FD-230" available from Kett Electric Laboratory, 5 g of the dispersion was subjected to measurement of a water content (%) thereof on a wet base (dispersion) at a drying temperature of 150° C. under a measuring mode 96 (monitoring time: 2.5 min/variation range: 0.05%). The solid concentration of the dispersion was calculated according to the following formula:

$$\text{Solid concentration}(\%) = 100 - M$$

wherein M is a water content (%) on a wet base (dispersion) which is represented by the formula: $[(W-W_0)/W] \times 100$ wherein W is a weight of the sample before measurement (initial weight of the sample); and $W_0$ is a weight of the sample after measurement (absolute dry weight).

[Particle Sizes of Core (Aggregated) Particles, Core Particles to which Crosslinked Resin Particles Adhere, Coalesced Particles and Toner (Particles)]

Measuring Apparatus Coulter Multisizer II (commercially available from Beckman Coulter Inc.)

Aperture Diameter: 50 μm

Analyzing Software: Coulter Multisizer AccuComp Ver. 1.19 (commercially available from Beckman Coulter Inc.)

Electrolyte Solution: "Isotone II" (commercially available from Beckman Coulter Inc.)

Dispersing Solution: The dispersing solution was prepared by dissolving "EMULGEN 109P" (commercially available from Kao Corporation; polyoxyethylene lauryl ether; HLB: 13.6) in the above electrolyte solution such that the concentration of "EMULGEN 109P" in the obtained solution was 5% by weight.

Dispersing Conditions: Ten milligrams (in terms of solid content) of a sample to be measured was added to 5 mL of the dispersing solution, and dispersed using an ultrasonic disperser for 1 min. Thereafter, 25 mL of the electrolyte solution was added to the dispersion, and the obtained mixture was further dispersed using the ultrasonic disperser for 1 min to prepare a sample dispersion.

Measuring Conditions: The thus prepared sample dispersion was added to 100 mL of the electrolyte solution, and after controlling a concentration of the resultant dispersion such that the determination for particle sizes of 30000 particles was completed within 20 s, the particle sizes of 30000 particles were measured under the above concentration condition, and a volume-median particle size ($D_{50}$) thereof was determined from the thus measured particle size distribution.

Resin Production Example 1

Production of Polyester A

A four-necked flask equipped with a nitrogen inlet tube, a dehydration tube, a stirrer and a thermocouple was charged with 8,320 g of polyoxypropylene (2.2)-2,2-bis(4-hydroxyphenyl)propane, 80 g of polyoxyethylene (2.0)-2,2-bis(4-hydroxyphenyl)propane, 1,592 g of terephthalic acid and 32 g of dibutyl tin oxide (as an esterification catalyst), and the contents of the flask were reacted with each other in a nitrogen atmosphere under normal pressure (101.3 kPa) at 230° C. for 5 h, and further reacted under reduced pressure (8.3 kPa). After the obtained reaction mixture was cooled to 210° C., 1,672 g of fumaric acid and 8 g of hydroquinone were added thereto to conduct a reaction therebetween for 5 h, and further the reaction was conducted under reduced pressure, thereby obtaining a polyester A. The thus obtained polyester A had a softening point of 110° C., a glass transition point of 66° C., an acid value of 24.4 mg KOH/g, and a number-average molecular weight of 3,760.

Resin Production Example 2

Production of Polyester B

A four-necked flask equipped with a nitrogen inlet tube, a dehydration tube, a stirrer and a thermocouple was charged with 1,750 g of polyoxypropylene (2.2)-2,2-bis(4-hydroxyphenyl)propane, 1,625 g of polyoxyethylene (2.0)-2,2-bis(4-hydroxyphenyl)propane, 1,145 g of terephthalic acid, 161 g of dodecenyl succinic anhydride, 480 g of trimellitic anhydride and 26 g of tin 2-ethylhexanoate, and the contents of the flask were reacted with each other while stirring at 220° C. in a nitrogen atmosphere until the softening point as measured according to ASTM D36-86 reached 120° C., thereby obtaining a polyester B. The thus obtained polyester B had a softening point of 121° C., a glass transition point of 65° C., an acid value of 21 mg KOH/g and a number-average molecular weight of 3,390.

Comparative Example 1

Production of Non-Crosslinked Resin Particle Dispersion A

A mixed resin composed of 390 g of the polyester A and 210 g of the polyester B (the mixed resin obtained by mixing the polyester A and the polyester B at such a mixing ratio had a softening point of 114° C., a glass transition point of 66° C. and an acid value of 23 mg KOH/g), 30 g of a copper phthalocyanine pigment "ECB301" available from Dainichiseika Color & Chemicals Mtg. Co., Ltd., 40 g of an anionic surfactant "NEOPELEX G-15" (sodium dodecylbenzenesulfonate; solid content: 15% by weight) available from Kao Corporation, 6 g of a nonionic surfactant "EMULGEN 430" (polyoxyethylene (26 mol) oleyl ether; HLB: 16.2) available from Kao Corporation and 279 g of a 5 wt % potassium hydroxide aqueous solution were dispersed at 25° C. in a 5 L stainless steel flask while stirring with a paddle-shaped stirrer at a rate of 200 r/min. The contents of the flask were stabilized at 95° C., and held for 2 h while stirring with a paddle-shaped stirrer at a rate of 200 r/min. Successively, while stirring with a paddle-shaped stirrer at a rate of 200 r/min, 1,135 g of deionized water was added dropwise into the flask at a rate of 6 g/min. The temperature of the reaction system during dropping the deionized water was maintained at 95° C. Thereafter, the obtained reaction mixture was cooled to 25° C., thereby obtaining a resin particle dispersion A in which resin particles were dispersed. The resin fine particles contained in the thus obtained resin particle dispersion A had a volume median particle size ($D_{50}$) of 0.2 µm, a softening point of 104° C. and a glass transition point of 60° C., and the resin particle dispersion A had a solid content of 32.0% by weight.

Comparative Example 2

Production of Non-Crosslinked Resin Particle Dispersion B

The same procedure as in Comparative Example 1 was repeated except that the temperature of the reaction system during dropping the deionized water was maintained at 97° C., thereby obtaining a non-crosslinked resin particle dispersion B. The properties of the thus obtained non-crosslinked resin particle dispersion B are shown in Table 1.

Example 1

Production of Crosslinked Resin Particle Dispersion A

Three hundred grams of the resin particle dispersion A (number of moles of a carboxyl group contained in the resin constituting the resin particles: 40 mmol) were heated to 95° C., and an aqueous solution containing 17.6 g of a water-soluble oxazoline group-containing polymer "WS700" (available from Nippon Shokubai Co., Ltd.; content of oxazoline group in the oxazoline group-containing polymer: 4.6 mmol/g; number-average molecular weight: 20,000; solid content of aqueous solution: 25%) (number of moles of oxazoline group: 20 mmol) was dropped thereto at a rate of 6 g/min (addition rate of solid components of the water-soluble oxazoline group-containing polymer based on 100 parts by weight of the resin constituting the resin particles: 1.6 g/min) while maintaining the aqueous solution at a temperature of 25° C. After completion of the dropping, the resulting reaction mixture was allowed to stand for 4 h. Thereafter, the reaction mixture was cooled to 25° C., and passed through a wire mesh having a 150 mesh screen (opening: 105 µm) to obtain a crosslinked resin particle dispersion A in which crosslinked resin particles were dispersed. The crosslinked resin particles in the thus obtained crosslinked resin particle dispersion A had a volume median particle size ($D_{50}$) of 0.24 µm, a softening point of 190° C. and a glass transition point of 58° C., and the crosslinked resin particle dispersion A had a solid content of 29.5% by weight. As a result, it was confirmed that no residue remained on the wire mesh.

Example 2

Production of Crosslinked Resin Particle Dispersion B

The same procedure as in Example 1 was repeated except that the amount of the oxazoline group-containing polymer added was changed as shown in Table 1, thereby obtaining a crosslinked resin particle dispersion B. The properties of the thus obtained crosslinked resin particle dispersion B are shown in Table 1.

Example 3

Production of Crosslinked Resin Particle Dispersion C

While maintaining 300 g of the resin particle dispersion B (number of moles of a carboxyl group contained in the resin constituting the resin particles: 40 mmol) at a temperature of 25° C., an aqueous solution containing 17.6 g of a water-soluble oxazoline group-containing polymer "WS700" (available from Nippon Shokubai Co., Ltd.; content of oxazoline group in the oxazoline group-containing polymer: 4.6 mmol/g; number-average molecular weight: 20,000; solid content of aqueous solution: 25%) (number of moles of oxazoline group: 20 mmol) was added dropwise thereto at a rate of 500 g/min (addition rate of solid components of the water-soluble oxazoline group-containing polymer based on 100 parts by weight of the resin constituting the resin fine particles: 130 g/min). After completion of the dropping, the resulting reaction mixture was allowed to stand for 1 h. Thereafter, the reaction mixture was cooled to 25° C., and passed through a wire mesh having a 150 mesh screen (opening: 105 μm) to obtain a crosslinked resin particle dispersion C in which crosslinked resin particles were dispersed. The crosslinked resin particles in the thus obtained crosslinked resin particle dispersion C had a volume median particle size ($D_{50}$) of 0.19 μm, a softening point of 190° C. and a glass transition point of 58° C., and the crosslinked resin particle dispersion C had a solid content of 31.6% by weight. As a result, it was confirmed that no residue remained on the wire mesh.

Examples 4 to 8

Production of Crosslinked Resin Particle Dispersions D to H

The same procedure as in Example 3 was repeated except that the kind and amount of the oxazoline group-containing polymer added were changed as shown in Table 1, thereby obtaining respective crosslinked resin particle dispersions D to H. The properties of the thus obtained crosslinked resin particle dispersions D to H are shown in Table 1.

Comparative Example 3

Crosslinked Resin Particle Dispersion I out of the Scope of the Present Invention The same procedure as in Example 3 was repeated except that a carbodiimide ("CARBODILITE" available from Nisshnbo Inc.) was use in such an amount as shown in Table 1 in place of the oxazoline group-containing polymer, thereby obtaining a crosslinked resin particle dispersion I. The properties of the thus obtained crosslinked resin particle dispersion I are shown in Table 1.

Comparative Example 4

Crosslinked Resin Particle Dispersion J Out of the Scope of the Present Invention The same procedure as in Example 3 was repeated except that the amount of the oxazoline group-containing polymer added was changed as shown in Table 1, and thereafter the resulting reaction mixture was continuously stirred for 1 h while maintaining its temperature at 25° C. and then passed through a wire mesh having a 150 mesh screen (opening: 105 μm), thereby obtaining a crosslinked resin particle dispersion J. The properties of the thus obtained crosslinked resin particle dispersion J are shown in Table 1.

Comparative Example 5

Crosslinked Resin Particle Dispersion K out of the Scope of the Present Invention A four-necked flask equipped with a nitrogen inlet tube, a reflux condenser, a stirrer and a thermocouple was charged with a mixed resin composed of 195 g of the polyester A and 105 g of the polyester B (the mixed resin obtained by mixing the polyester A and the polyester B at such a mixing ratio had a softening point of 114° C., a glass transition point of 66° C. and an acid value of 23 mg KOH/g), 20 g of an anionic surfactant "NEOPELEX G-15" (sodium dodecylbenzenesulfonate; solid content: 15% by weight) available from Kao Corporation and 3 g of a nonionic surfactant "EMULGEN 430" (polyoxyethylene (26 mol) oleyl ether; HLB: 16.2) available from Kao Corporation. Then, the flask was further charged with 540 g of methyl ethyl ketone, and the contents of the flask were dissolved at 25° C. while stirring with a paddle-shaped stirrer at a rate of 200 r/min to prepare a solution. Next, the thus obtained solution was mixed with 16.3 g of a 30% potassium hydroxide aqueous solution and then with 703 g of deionized water while stirring, and thereafter methyl ethyl ketone was removed by distillation under reduced pressure from the resulting reaction solution, thereby obtaining a resin particle dispersion C. The resin particles in the thus obtained resin particle dispersion C had a volume median particle size ($D_{50}$) of 110 nm, a softening point of 108° C. and a glass transition point of 61° C., and the resin particle dispersion C had a solid content of 29.7% and a pH of 7.4. Next, the same procedure as in Example 3 was repeated except that the thus obtained resin particle dispersion C was used and the amount of the oxazoline group-containing polymer added to the dispersion was changed as shown in Table 1, thereby obtaining a crosslinked resin particle dispersion K. The properties of the thus obtained crosslinked resin particle dispersion K are shown in Table 1.

The respective crosslinked resin particle dispersions obtained above were evaluated for stability thereof according to the following procedures. The results are shown in Table 1.

[Measurement of Critical Aggregation Concentration (Stability)]

(1) Five (5.0) grams of the resin particle dispersion (25° C.) were weighed in a 30 cc screwed glass bottle, and then deionized water was added thereto to adjust a solid content of the dispersion to 25.4%, thereby preparing a sample solution.

(2) Ammonium sulfate (available from Sigma Aldrich Japan Co., Ltd.; guaranteed reagent) was weighed such that the number of moles of ammonium sulfate was 8 times that of a carboxyl group contained in the polyester constituting the resin particles in the sample solution.

(3) Deionized water was added to the thus weighed ammonium sulfate to prepare an aqueous ammonium sulfate solution containing ammonium sulfate in such an amount that an ammonium ion concentration in the sample solution was 0.01 mol/L when added thereto.

(4) The aqueous ammonium sulfate solution was added at one time to the sample solution, and then the screwed glass bottle was plugged.

(5) The contents of the screwed glass bottle were stirred on rollers (ball mill) at 25° C. for 12 h at a rotating speed of 500 rpm (revolutions/min).

(6) The volume median particle size of the particles in the screwed glass bottle was measured using "LA-920" available from Horiba Ltd.

(7) The same test was repeated under the conditions in which the ammonium ion concentration in the sample solution to which the aqueous ammonium sulfate solution was added was adjusted to 0.05 mol/L, 0.1 mol/L, . . . , and 1 mol/L.

(8) When plotting the ammonium ion concentrations in the sample solution to which the aqueous ammonium sulfate solution was added on the abscissa axis and the particle sizes on the ordinate axis to prepare a characteristic curve, the critical aggregation concentration of the respective dispersions was determined as the concentration at which an extension of a base line on the low concentration side including an ammonium ion concentration of 0.01 mol/L intersects a tangential line having a maximum inclination in a region from a raise-up portion of the particle size up to an ammonium ion concentration of 1 mol/L in the curve.

TABLE 1

| | Examples | | | | | |
|---|---|---|---|---|---|---|
| | 1 | 2 | 3 | 4 | 5 | 6 |
| Crosslinked resin particle dispersion | A | B | C | D | E | F |
| Resin particle dispersion | A | A | B | B | B | B |
| Particle size of resin particles ($D_{50}$; μm) | 0.20 | 0.20 | 0.15 | 0.15 | 0.15 | 0.15 |
| Softening point of resin particles (° C.) | 104 | 104 | 104 | 104 | 105 | 105 |
| Glass transition point of resin particles (° C.) | 60 | 60 | 60 | 60 | 60 | 60 |
| Temperature of resin particle dispersion upon addition of polymer thereto (° C.) | 95 | 95 | 25 | 25 | 25 | 25 |
| Temperature of resin particle dispersion upon mixing (° C.) | 95 | 95 | 95 | 95 | 95 | 95 |
| Oxazoline group-containing polymer | WS-700 | WS-700 | WS-700 | WS-700 | WS-700 | WS-700 |
| Oxazoline value (g/Eq) (carbodiimide value (g/Eq)) | 220 | 220 | 220 | 220 | 220 | 220 |
| Amount of oxazoline group-containing polymer added (wt % based on resin) | 4.6 | 4.6 | 4.6 | 2.3 | 1.15 | 0.76 |
| Dropping rate of oxazoline group-containing polymer (g/min) | 1.6 | 1.6 | 500 | 500 | 500 | 500 |
| Ratio of number of moles of oxazoline group in polymer/number of moles of carboxyl group in resin binder | 0.5 | 0.25 | 0.5 | 0.25 | 0.125 | 0.083 |
| Particle size of crosslinked resin particles (nm) | 0.24 | 0.22 | 0.19 | 0.19 | 0.16 | 0.16 |
| Softening point of crosslinked resin particles (° C.) | 190 | 140 | 190 | 132 | 113 | 109 |
| Glass transition point of crosslinked resin particles (° C.) | 58 | 58 | 58 | 58 | 59 | 59 |
| Solid content (wt %) | 29.5 | 30.5 | 31.6 | 31.7 | 31.5 | 31.7 |
| Critical aggregation concentration (M) | 1.0 | 0.8 | 1.0 | 0.8 | 0.7 | 0.7 |

| | Examples | | Comparative Examples | | | | |
|---|---|---|---|---|---|---|---|
| | 7 | 8 | 1 | 2 | 3 | 4 | 5 |
| Crosslinked resin particle dispersion | G | H | — | — | I | J | K |
| Resin particle dispersion | B | B | A | B | B | B | C |
| Particle size of resin particles ($D_{50}$; μm) | 0.15 | 0.15 | 0.20 | 0.15 | 0.15 | 0.15 | 0.11 |
| Softening point of resin particles (° C.) | 105 | 105 | 104 | 104 | 104 | 104 | 108 |
| Glass transition point of resin particles (° C.) | 60 | 60 | 60 | 60 | 60 | 60 | 61 |
| Temperature of resin particle dispersion upon addition of polymer thereto (° C.) | 25 | 25 | — | — | 25 | 25 | 25 |
| Temperature of resin particle dispersion upon mixing (° C.) | 95 | 95 | — | — | 95 | 25 | 95 |
| Oxazoline group-containing polymer | WS-700 | WS-300 | — | — | Carbo-diimide | WS-700 | WS-700 |
| Oxazoline value (g/Eq) (carbodiimide value (g/Eq)) | 220 | 130 | — | — | 383 | 220 | 220 |
| Amount of oxazoline group-containing polymer added (wt % based on resin) | 0.4 | 0.67 | — | — | 2.48 | 1.15 | 1.15 |
| Dropping rate of oxazoline group-containing polymer (g/min) | 500 | 500 | — | — | 500 | 500 | 500 |
| Ratio of number of moles of oxazoline group in polymer/number of moles of carboxyl group in resin binder | 0.063 | 0.25 | 0 | 0 | 0.5 | 0.125 | 0.125 |

TABLE 1-continued

| | | | | | | | |
|---|---|---|---|---|---|---|---|
| Particle size of crosslinked resin particles (nm) | 0.15 | 0.25 | — | — | 0.15 | 0.15 | 0.14 |
| Softening point of crosslinked resin particles (° C.) | 107 | 108 | — | — | 104 | 104 | 115 |
| Glass transition point of crosslinked resin particles (° C.) | 59 | 59 | — | — | 60 | 60 | 60 |
| Solid content (wt %) | 31.7 | 32.0 | 32.0 | 31.6 | 32.0 | 32.0 | 29.7 |
| Critical aggregation concentration (M) | 0.6 | 0.7 | 0.4 | 0.4 | 0.4 | 0.4 | 0.2 |

Releasing Agent Dispersion Production Example 1

Production of Releasing Agent Dispersion A

After dissolving 3.57 g of an aqueous solution of dipotassium alkenyl succinate ("LATEMUL ASK" available from Kao Corp.; concentration of effective ingredients: 28%) in 400 g of deionized water in a 1 L beaker, 100 g of a carnauba wax (available from S. KATO & Company; melting point: 85° C.) were dispersed in the resultant solution. While maintaining the obtained dispersion at a temperature of 90 to 95° C., the dispersion was subjected to dispersing treatment for 30 min using "Ultrasonic Homogenizer 600W" (available from Nippon Seiki Co., Ltd.), thereby obtaining a releasing agent dispersion A. The releasing agent contained in the thus obtained releasing agent dispersion A had a volume median particle size ($D_{50}$) of 0.47 μm and a CV value of 26, and the releasing agent dispersion A had a solid content of 23% by weight.

Example 9

Production of Cyan Toner A

[Step 1]
A dispersion prepared by adding 88 g of deionized water to 295 g of the resin particle dispersion A and a dispersion prepared by adding 2 g of deionized water to 23 g of the releasing agent dispersion A both were charged into a 2 L four-necked flask equipped with a dehydration tube, a stirrer and a thermocouple and mixed with each other therein at room temperature. While stirring the resulting mixed dispersion with a paddle-shaped stirrer, an aqueous solution prepared by dissolving 19 g of ammonium sulfate (guaranteed reagent available from Sigma Aldrich Japan Co., Ltd.) in 129 g of deionized water was dropped into the mixed dispersion at room temperature over 10 min. Thereafter, the resultant mixed dispersion was heated to 55° C. to form core (aggregated) particles. Then, the dispersion was held at 55° C. until the volume median particle size ($D_{50}$) of the core (aggregated) particles reached 4.6 μm, thereby obtaining a core (aggregated) particle dispersion containing the core (aggregated) particles.
[Step 2]
The core (aggregated) particle dispersion obtained in the step (1) was cooled to 53° C., and then a mixture of 32 g of the crosslinked resin particle dispersion A as a shell material and 6 g of deionized water was dropped into the core (aggregated) particle dispersion at a rate of 1.4 g/min (addition rate of the resin component constituting the crosslinked resin particles on the basis of 100 parts by weight of the resin component constituting the core (aggregated) particles: 0.44 part by weight/min). After completion of the dropping, the resulting dispersion was held at 53° C. for 20 min. This procedure was further repeated twice. Then, a mixture of 32 g of the crosslinked resin particle dispersion A and 6 g of deionized water and an aqueous solution prepared by dissolving 2 g of ammonium sulfate in 28 g of deionized water were separately dropped into the dispersion at a rate of 1.4 g/min, and the resulting dispersion was held for 20 min. This procedure was repeated one more time. Thereafter, an aqueous solution prepared by dissolving 1.7 g of ammonium sulfate in 26 g of deionized water was dropped into the dispersion at a rate of 1.4 g/min, and then an aqueous solution prepared by diluting 25 g of an aqueous solution of sodium polyoxyethylene (2 mol) dodecylethersulfate (solid content: 28% by weight) with 370 g of deionized water was added to the obtained dispersion, thereby producing core particles to which the crosslinked resin particles adhered. It was confirmed that the volume median particle size ($D_{50}$) of the core particles to which the crosslinked resin particles adhered was 5.2 μm.
[Step 3]
The dispersion of the core particles to which the crosslinked resin particles adhered obtained in the step (2) was heated to 80° C. over 3 h. Thereafter, the dispersion was mixed with 700 g of deionized water and held at 80° C. for 1 h, and then cooled to room temperature. During the above procedure, the configuration of the toner was changed from the core particles to which the crosslinked resin particles adhered, to coalesced particles. It was confirmed that the volume median particle size ($D_{50}$) of the thus obtained coalesced particles was 6.5 μm.

The resultant dispersion containing the coalesced particles was subjected to a suction filtration step, a washing step and a drying step to obtain colored resin particles. In the washing step, the dispersion containing the coalesced particles was charged into a centrifugal dehydrator ("Centrifugal Separator H-122" available from KOKUSAN Co., Ltd.). While subjecting the coalesced particles to centrifugal separation at a peripheral speed of 47 m/s (rotating speed: 3000 rpm; diameter: 30 cm), the coalesced particles were washed by mixing deionized water therewith at a rate of 6±0.5 L per 100 g of the resin in the coalesced particles. Thereafter, the centrifugal dehydrator was further rotated for 1 h to reduce a water content in the colored resin particles, and then the colored resin particles were allowed to stand in a vacuum dryer maintained at 40° C. to dry the particles, thereby obtaining toner particles.

Next, 2.5 parts by weight of a hydrophobic silica 1 ("RY50" available from Nippon Aerosil Co., Ltd.), 1.0 part by weight of a hydrophobic silica 2 ("CAB-O-SIL TS-720" available from Cabot Corp.) and 0.8 part by weight of organic fine particles ("FINESFAIR P2000" available from Nippon Paint Co., Ltd.) were externally added to 100 parts by weight of the toner particles using a Henschel mixer, thereby obtaining a cyan toner A. The thus obtained cyan toner A had a volume median particle size ($D_{50}$) of 6.7 μm.

Example 10

Production of Cyan Toner B

The same procedure as in Example 9 was repeated except that the crosslinked resin particle dispersion B was used in place of the crosslinked resin particle dispersion A, thereby obtaining a cyan toner B. The thus obtained cyan toner B had a volume median particle size ($D_{50}$) of 6.5 μm.

Examples 11 to 14

Production of Cyan Toners C to F

The same procedure as in Example 9 was repeated except that the crosslinked resin particle dispersion A and the resin particle dispersion A were respectively changed as shown in Table 2, thereby obtaining cyan toners C to F. The properties of the respective cyan toners C to F thus obtained are shown in Table 2.

Comparative Example 6

Production of Cyan Toner G

The same procedure as in Example 9 was repeated except that the resin particle dispersion A was used in place of the crosslinked resin particle dispersion A, thereby obtaining a cyan toner G. The thus obtained cyan toner G had a volume median particle size ($D_{50}$) of 5.2 μm.

Comparative Example 7

Production of Cyan Toner H

[Step 1]

A dispersion prepared by adding 88 g of deionized water to 295 g of the resin particle dispersion A and a dispersion prepared by adding 2 g of deionized water to 23 g of the releasing agent dispersion A both were charged into a 2 L four-necked flask equipped with a dehydration tube, a stirrer and a thermocouple and mixed with each other therein at room temperature. While stirring the resulting mixed dispersion with a paddle-shaped stirrer, an aqueous solution prepared by dissolving 19 g of ammonium sulfate (guaranteed reagent available from Sigma Aldrich Japan Co., Ltd.) in 129 g of deionized water was dropped into the mixed dispersion at room temperature over 10 min. Thereafter, the resultant mixed dispersion was heated to 55° C. to form core (aggregated) particles. Then, the dispersion was held at 55° C. until the volume median particle size ($D_{50}$) of the core (aggregated) particles reached 4.6 μm, thereby obtaining a core (aggregated) particle dispersion containing the core (aggregated) particles.

[Step 2]

The core (aggregated) particle dispersion obtained in the step (1) was held at 55° C., and then a mixture of 30 g of the resin particle dispersion A as a shell material and 8 g of deionized water was dropped into the core (aggregated) particle dispersion at a rate of 1.4 g/min (addition rate of the resin component constituting the crosslinked resin particles on the basis of 100 parts by weight of the resin component constituting the core (aggregated) particles: 0.44 part by weight/min). After completion of the dropping, the resulting dispersion was held at 55° C. for 20 min. This procedure was further repeated twice. Then, a mixture of 30 g of the resin particle dispersion A and 8 g of deionized water and an aqueous solution prepared by dissolving 2 g of ammonium sulfate in 25 g of deionized water were separately dropped into the dispersion at a rate of 1.4 g/min, and the resulting dispersion was held for 20 min. This procedure was repeated one more time. Thereafter, the dispersion was mixed with 12.8 g of a water-soluble oxazoline group-containing polymer "WS700" available from Nippon Shokubai Co., Ltd., and then stirred for 10 min. To the thus obtained mixture was added an aqueous solution prepared by diluting 20 g of an aqueous solution of sodium polyoxyethylene (2 mol) dodecylethersulfate (solid content: 28% by weight) with 377 g of deionized water, thereby producing core particles to which the resin particles adhered. It was confirmed that the volume median particle size ($D_{50}$) of the core particles to which the resin particles adhered was 5.5 μm.

[Step 3]

After completion of the step (2), the obtained dispersion was heated to 80° C. over 3 h. Thereafter, the dispersion was held at 80° C. for 1 h, and then cooled to room temperature. During the above procedure, the configuration of the toner was changed from the core particles to which the resin particles adhered, to coalesced particles. It was confirmed that the volume median particle size ($D_{50}$) of the thus obtained coalesced particles was 5.5 μm.

The resultant dispersion containing the coalesced particles was subjected to a suction filtration step, a washing step and a drying step to obtain colored resin particles. In the washing step, the dispersion containing the coalesced particles was charged into a centrifugal dehydrator ("Centrifugal Separator H-122" available from KOKUSAN Co., Ltd.). While subjecting the coalesced particles to centrifugal separation at a peripheral speed of 47 m/s (rotating speed: 3000 rpm; diameter: 30 cm), the coalesced particles were washed by mixing deionized water therewith at a rate of 6±0.5 L per 100 g of the resin in the coalesced particles. Thereafter, the centrifugal dehydrator was further rotated for 1 h to reduce a water content in the colored resin particles, and then the colored resin particles were allowed to stand in a vacuum dryer maintained at 40° C. to dry the particles, thereby obtaining toner particles.

Next, 2.5 parts by weight of a hydrophobic silica 1 ("RY50" available from Nippon Aerosil Co., Ltd.), 1.0 part by weight of a hydrophobic silica 2 ("CAB-O-SIL TS-720" available from Cabot Corp.) and 0.8 part by weight of organic fine particles ("FINESFAIR P2000" available from Nippon Paint Co., Ltd.) were externally added to 100 parts by weight of the toner particles using a Henschel mixer, thereby obtaining a cyan toner H. The thus obtained cyan toner H had a volume median particle size ($D_{50}$) of 5.6 μm.

Comparative Example 8

Production of Cyan Toner I

[Step 1]

A dispersion prepared by adding 88 g of deionized water to 295 g of the resin particle dispersion A and a dispersion prepared by adding 2 g of deionized water to 23 g of the releasing agent dispersion A both were charged into a 2 L four-necked flask equipped with a dehydration tube, a stirrer and a thermocouple and mixed with each other therein at room temperature. While stirring the resulting mixed dispersion with a paddle-shaped stirrer, 12.8 g of "WS700" available from Nippon Shokubai Co., Ltd., were added to the dispersion, and then an aqueous solution prepared by dissolving 19 g of ammonium sulfate (guaranteed reagent available from Sigma Aldrich Japan Co., Ltd.) in 129 g of deionized water was dropped into the mixed dispersion at room temperature over 10 min. Thereafter, the resultant mixed dispersion was heated to 55° C. to form core (aggregated) particles. Then, the dispersion was held at 55° C. until the volume median particle size ($D_{50}$) of the core (aggregated) particles reached 5.0 μm, thereby obtaining a core (aggregated) particle dispersion containing the core (aggregated) particles.
[Step 2]

The core (aggregated) particle dispersion obtained in the step (1) was held at 55° C., and then a mixture of 30 g of the resin particle dispersion A as a shell material and 8 g of deionized water was dropped into the core (aggregated) particle dispersion at a rate of 1.4 g/min (addition rate of the resin component constituting the crosslinked resin particles on the basis of 100 parts by weight of the resin component constituting the core (aggregated) particles: 0.44 part by weight/min). After completion of the dropping, the resulting dispersion was held at 55° C. for 20 min. This procedure was further repeated twice. Then, a mixture of 30 g of the resin particle dispersion A and 8 g of deionized water and an aqueous solution prepared by dissolving 2 g of ammonium sulfate in 25 g of deionized water were separately dropped into the dispersion at a rate of 1.4 g/min, and the resulting dispersion was held for 20 min. This procedure was repeated one more time. Thereafter, the dispersion was mixed with an aqueous solution prepared by diluting 20 g of an aqueous solution of sodium polyoxyethylene (2 mol) dodecylethersulfate (solid content: 28% by weight) with 377 g of deionized water, thereby producing core particles to which the resin particles adhered. It was confirmed that the volume median particle size ($D_{50}$) of the core particles to which the resin particles adhered was 5.9 μm.

Thereafter, the same procedure as in the step (3) of Comparative Example 7 was carried out to obtain a cyan toner I having a volume median particle size ($D_{50}$) of 6.0 μm.

Comparative Example 9

Production of Cyan Toner J

The same procedure as in Comparative Example 7 was repeated except that the water-soluble oxazoline group-containing polymer "WS700" available from Nippon Shokubai Co., Ltd., was used in an amount of 25.6 g, thereby obtaining a cyan toner J.

The respective cyan toners A to J obtained above were evaluated by the following methods. The results are shown in Table 2.
[Fusing Ability of Toner]

The respective toners were loaded into a commercially available printer "ML5400" available from Oki Data Corporation, and a solid image having a length of 40 mm was printed on a paper in such an unfused condition that an amount of the unfused toner deposited on the paper was 0.45±0.03 mg/cm². The thus obtained unfused solid image on the paper was fused by passing the paper through a fusing device mounted to the printer "ML5400" available from Oki Data Corporation, which device had been modified such that toner images are capable of being fused in an off-line state, at a fusing speed at each temperature of 40 sheets/min (in a longitudinal direction of the A4 paper). The fusing of the unfused solid image was repeated while raising the fusing temperature from 100° C. to 200° C. at the intervals of 5° C. The paper used in the above fusing test was a wood-free paper "P Paper" (A4) available from Xerox Corp.

A mending tape ("Scotch Mending Tape 810" available from 3M; width: 18 mm) was attached to the fused image obtained at the respective fusing temperatures. Then, a 500 g weight of a cylindrical shape having a diameter of 5 cm and a height of 3 cm was placed on the tape thus attached, and reciprocated by one stroke over the tape at a speed of 10 mm/s while press-contacting the weight thereon. Thereafter, the attached tape was peeled off from the fused image at a peel angle of 180° and a peel speed of 10 mm/s. The optical reflection density values of the fused image before and after peeling the tape therefrom were measured by placing each fused image on 30 sheets of a wood-free paper "EXCELLENT WHITE PAPER" (A4) available from Oki Data Corporation, using a colorimeter "SpectroEye" available from Gretag-Macbeth Corp., under the light-irradiation conditions including a standard light source $D_{50}$ and an observation visual field of 2° according to a density standard DIN NB based on absolute white color. The temperature of the fusing roller at which the proportion between both the reflection density values (after peeling/before peeling) first exceeded 90% and no cold offset owing to poor fusing still occurred, was determined as the minimum fusing temperature. Also, the hot-offset occurrence temperature was measured at the same time. In addition, the fusing temperature range was determined from the difference between the "hot-offset occurrence temperature–(minus) 5° C." and the minimum fusing temperature. The results are shown in Table 2.
[Fogging of Toner]

The respective toners were loaded into a commercially available printer "ML5400" available from Oki Data Corporation, and a blank image with no printing information was printed on a wood-free paper "EXCELLENT WHITE PAPER" (A4) available from Oki Data Corporation. The operation of the printer was interrupted at the time at which a half of the blank image was transferred on the A4 paper. A transparent mending tape ("Scotch Mending Tape 810-3-18" available from 3M) was attached onto a surface of a photoconductor before transferring the image thereonto in order to sample the toner present thereon.

Both a mending tape as a reference tape and the above mending tape on which the toner on the photoconductor was sampled, were attached onto a virgin "EXCELLENT WHITE PAPER" and subjected to measurement of a color difference (ΔE*ab) between both the tapes which is represented by the following formula, using the colorimeter "SpectroEye" (under the same measuring conditions as used above) to determine a degree of fogging thereon. The smaller the ΔE*ab value, the less the fogging, i.e., the higher the quality of reproduced image. The results are shown in Table 2.

$$\Delta E^*ab = [(L^*_1 - L^*_2)^2 + (a^*_1 - a^*_2)^2 + (b^*_1 - b^*_2)^2]^{1/2}$$

wherein $L^*_1$, $a^*_1$ and $b^*_1$ represent respective values of the mending tape as a reference tape; and $L^*_2$, $a^*_2$ and $b^*_2$ represent respective values of the mending tape on which the toner on the photoconductor was sampled.

TABLE 2

|  | Examples | | |
| --- | --- | --- | --- |
|  | 9 | 10 | 11 |
| Toner | Cyan toner A | Cyan toner B | Cyan toner C |
| Equivalent amount of oxazoline group based on resin binder in whole toner | 0.17 | 0.08 | 0.33 |
| Step (1) |  |  |  |
| Core particle dispersion | A* | A* | C** |
| Number of moles of oxazoline | — | — | 0.5 |

TABLE 2-continued

|  | | | |
|---|---|---|---|
| group in polymer/number of moles of carboxyl group in resin binder constituting core particles | | | |
| Core particle dispersion (g) | 295 | 295 | 250 |
| Releasing agent dispersion (g) | 23 | 23 | 23 |
| Aggregating agent (g) | 19 | 19 | 24 |
| Ion-exchanged water (g) | 129 | 129 | 300 |
| Step (2) | | | |
| Shell particle dispersion | A** | B** | B* |
| Number of moles of oxazoline group in polymer/number of moles of carboxyl group in resin binder constituting shell particles | 0.5 | 0.25 | — |
| Order of dropping of shell particle dispersion (number of times) | 1st–5th times | 1st–5th times | 1st–5th times |
| Dropping rate (g/min) | 1.4 | 1.4 | 1.4 |
| Retention time (min) | 20 | 20 | 20 |
| Temperature (° C.) | 53 | 53 | 55 |
| Step (3) | | | |
| Particle size of coalesced particles ($D_{50}$; μm) | 6.5 | 6.3 | 5.2 |
| Properties of toner | | | |
| Particle size of toner (μm) | 6.7 | 6.5 | 5.3 |
| Softening point of toner (° C.) | 116.2 | 105.5 | 116 |
| Glass transition point of toner (° C.) | 55.7 | 55.9 | 53.7 |
| Evaluation of toner images | | | |
| Minimum fusing temperature (° C.) | 125 | 125 | 145 |
| Hot-offset occurrence temperature (° C.) | 170 | 150 | 175 |
| Fusing temperature range | 40 | 20 | 25 |
| ΔE (fogging) | 0.2 | 0.3 | 0.8 |

|  | Examples | | |
|---|---|---|---|
|  | 12 | 13 | 14 |
| Toner | Cyan toner D | Cyan toner E | Cyan toner F |
| Equivalent amount of oxazoline group based on resin binder in whole toner | 0.25 | 0.125 | 0.083 |
| Step (1) | | | |
| Core particle dispersion | D** | E** | F** |
| Number of moles of oxazoline group in polymer/number of moles of carboxyl group in resin binder constituting core particles | 0.25 | 0.125 | 0.083 |
| Core particle dispersion (g) | 250 | 250 | 250 |
| Releasing agent dispersion (g) | 23 | 23 | 23 |
| Aggregating agent (g) | 24 | 24 | 24 |
| Ion-exchanged water (g) | 300 | 300 | 300 |
| Step (2) | | | |
| Shell particle dispersion | D** | E** | F** |
| Number of moles of oxazoline group in polymer/number of moles of carboxyl group in resin binder constituting shell particles | 0.25 | 0.125 | 0.083 |
| Order of dropping of shell particle dispersion (number of times) | 1st–5th times | 1st–5th times | 1st–5th times |
| Dropping rate (g/min) | 1.4 | 1.4 | 1.4 |
| Retention time (min) | 20 | 20 | 20 |
| Temperature (° C.) | 62 | 45 | 52 |
| Step (3) | | | |
| Particle size of coalesced particles ($D_{50}$; μm) | 6.0 | 5.0 | 6.0 |
| Properties of toner | | | |
| Particle size of toner (μm) | 6.1 | 5.0 | 6.0 |
| Softening point of toner (° C.) | 133 | 115 | 108 |
| Glass transition point of toner (° C.) | 53.6 | 54 | 50.6 |
| Evaluation of toner images | | | |
| Minimum fusing temperature (° C.) | 145 | 140 | 135 |
| Hot-offset occurrence temperature (° C.) | 200 | 200 | 170 |
| Fusing temperature range | 50 | 55 | 30 |
| ΔE (fogging) | 0.9 | 0.5 | 0.6 |

|  | Comparative Examples | | | |
|---|---|---|---|---|
|  | 6 | 7 | 8 | 9 |
| Toner | Cyan toner G | Cyan toner H | Cyan toner I | Cyan toner J |
| Equivalent amount of oxazoline group based on resin binder in whole toner | 0.00 | 0.25 | 0.25 | 0.50 |
| Step (1) | | | | |
| Core particle dispersion | A* | A* | A* | A* |
| Number of moles of oxazoline group in polymer/number of moles of carboxyl group in resin binder | 0 | 0 | 0 | 0 |
| Core particle dispersion (g) | 250 | 250 | 250 | 250 |
| Releasing agent dispersion (g) | 23 | 23 | 23 | 23 |
| Aggregating agent (g) | 19 | 19 | 19 | 19 |
| Ion-exchanged water (g) | 129 | 129 | 129 | 129 |
| Step (2) | | | | |
| Shell particle dispersion | A* | A* | A* | A* |
| Number of moles of oxazoline group in polymer/number of moles of carboxyl group in resin binder | 0 | 0 | 0 | 0 |
| Order of dropping of shell particle dispersion (number of times) | 1st–5th times | 1st–5th times | 1st–5th times | 1st–5th times |
| Dropping rate (g/min) | 1.4 | 1.4 | 1.4 | 1.4 |
| Retention time (min) | 20 | 20 | 20 | 20 |
| Temperature (° C.) | 55 | 55 | 55 | 55 |
| Step (3) | | | | |
| Particle size of coalesced particles ($D_{50}$; μm) | 5.1 | 5.5 | 5.9 | 5.9 |
| Properties of toner | | | | |
| Particle size of toner (μm) | 5.2 | 5.6 | 6.0 | 6.0 |
| Softening point of toner (° C.) | 99 | 117 | 122 | 138 |
| Glass transition point of toner (° C.) | 53 | 52.3 | 54 | 52.2 |
| Evaluation of toner images | | | | |
| Minimum fusing temperature (° C.) | 125 | 145 | 130 | 145 |
| Hot-offset occurrence temperature (° C.) | 130 | 190 | 190 | 200 |
| Fusing temperature range | 0 | 45 | 60 | 50 |
| ΔE (fogging) | 0.3 | 2.5 | 0.4 | 2.5 |

Note
A* Resin particle dispersion A;
B* Resin particle dispersion B;
A** Crosslinked resin particle dispersion A;
B** Crosslinked resin particle dispersion B;
C** Crosslinked resin particle dispersion C;
D** Crosslinked resin particle dispersion D;
E** Crosslinked resin particle dispersion E;
F** Crosslinked resin particle dispersion F

INDUSTRIAL APPLICABILITY

In accordance with the present invention, there can be produced a toner for electrophotography which has a broad fusing temperature range and excellent image characteristics. Therefore, the dispersion of crosslinked resin particles and the toner according to the present invention can be suitably used as a toner for electrophotography which is employed in electrophotographic method, electrostatic recording method, electrostatic printing method, etc.

What is claimed is:

1. A dispersion of crosslinked resin particles having a volume median particle size ($D_{50}$) of from 0.05 to 0.7 μm, said dispersion being produced by a process comprising:
   (A) neutralizing a resin containing an acid group-containing polyester in an aqueous medium to obtain a dispersion of resin particles; and
   (B) mixing the dispersion of resin particles obtained in said (A) neutralizing with an oxazoline group-containing polymer at a temperature of from 60 to 100° C.

2. The dispersion according to claim 1, wherein the acid group-containing polyester has an acid value of from 6 to 35 mg KOH/g.

3. The dispersion according to claim 1, wherein the acid group-containing polyester is obtained from raw material components comprising a trivalent or higher-valent polycarboxylic acid.

4. The dispersion according to claim 1 which is used for a toner for electrophotography.

5. A toner for electrophotography which is obtained by aggregating and coalescing the crosslinked resin particles contained in the dispersion of crosslinked resin particles as defined in claim 1.

6. The toner for electrophotography according to claim 5, wherein the toner is obtained by mixing said dispersion of crosslinked resin particles with a dispersion of resin-containing core particles having a volume median particle size ($D_{50}$) of from 1 to 10 μm and then coalescing the core particles to which the crosslinked resin particles are allowed to adhere.

7. A process for producing a dispersion of crosslinked resin particles having a volume median particle size ($D_{50}$) of from 0.05 to 0.7 μm, comprising:
   (A) neutralizing a resin containing an acid group-containing polyester in an aqueous medium to obtain a dispersion of resin particles; and
   (B) mixing the dispersion of resin particles obtained in said (A) neutralizing with an oxazoline group-containing polymer at a temperature of from 60 to 100° C.

8. A process for producing a toner comprising:
   (a) obtaining a dispersion of crosslinked resin particles by the process as defined in claim 7; and
   (b) aggregating and coalescing the crosslinked resin particles contained in the dispersion of crosslinked resin particles obtained in said (a) obtaining.

* * * * *